United States Patent
Seger, Jr. et al.

(10) Patent No.: US 12,174,770 B2
(45) Date of Patent: Dec. 24, 2024

(54) DATA CONVEYANCE AND COMMUNICATION OF THREE OR MORE LVDC ENABLED DEVICES

(71) Applicant: SigmaSense, LLC., Wilmington, DE (US)

(72) Inventors: Richard Stuart Seger, Jr., Belton, TX (US); Daniel Keith Van Ostrand, Leander, TX (US); Gerald Dale Morrison, Redmond, WA (US); Timothy W. Markison, Mesa, AZ (US)

(73) Assignee: SigmaSense, LLC., Austin, TX (US)

( * ) Notice: Subject to any disclaimer, the term of this patent is extended or adjusted under 35 U.S.C. 154(b) by 0 days.

(21) Appl. No.: 18/234,974

(22) Filed: Aug. 17, 2023

(65) Prior Publication Data
US 2023/0394002 A1 Dec. 7, 2023

Related U.S. Application Data

(63) Continuation of application No. 17/649,907, filed on Feb. 3, 2022, which is a continuation of application
(Continued)

(51) Int. Cl.
*G06F 13/40* (2006.01)
*H04L 12/40* (2006.01)
(Continued)

(52) U.S. Cl.
CPC .......... *G06F 13/4027* (2013.01); *H04L 12/40* (2013.01); *H04L 47/82* (2013.01); *H04W 16/10* (2013.01)

(58) Field of Classification Search
CPC ..... G06F 13/4027; H04L 12/40; H04L 47/82; H04W 16/10
See application file for complete search history.

(56) References Cited

U.S. PATENT DOCUMENTS

| 5,437,178 A | 8/1995 | Esin et al. |
| 6,052,377 A | 4/2000 | Ohmi |

(Continued)

FOREIGN PATENT DOCUMENTS

| CN | 104536627 A | 4/2015 |
| CN | 107771273 A | 3/2018 |

(Continued)

OTHER PUBLICATIONS

European Patent Office; Extended European Search Report; Application No. 19853507.2; Jun. 13, 2023; 7 pgs.
(Continued)

*Primary Examiner* — Brian T Misiura
(74) *Attorney, Agent, or Firm* — GARLICK & MARKISON; Timothy W. Markison

(57) ABSTRACT

A communication system comprises three low voltage drive circuits operable for coupling to a wired bus, wherein a low voltage drive circuit of the three low voltage drive circuits includes a transmit section operably coupled to convert transmit digital data into an analog transmit signal that includes one or more transmit frequency components. The communication system further comprises a receive section operably coupled to convert an analog receive signal that includes one or more receive frequency components into received digital data. The communication system further comprises a drive sense circuit for coupling to the wired bus and after the three low voltage drive circuits are operably coupled to the wired bus, each of the three voltage drive circuits is configured for communication among the three low voltage drive circuits, for one-to-one communication, for one-to-many communication, and for many-to-one communication.

8 Claims, 30 Drawing Sheets data communication system 10

Related U.S. Application Data

No. 17/520,447, filed on Nov. 5, 2021, now Pat. No. 11,580,045, which is a continuation of application No. 17/093,101, filed on Nov. 9, 2020, now Pat. No. 11,169,948, which is a continuation of application No. 16/247,164, filed on Jan. 14, 2019, now Pat. No. 10,831,690.

(51) Int. Cl.
*H04L 47/70* (2022.01)
*H04W 16/10* (2009.01)

(56) References Cited

U.S. PATENT DOCUMENTS

| | | | |
|---|---|---|---|
| 6,218,972 | B1 | 4/2001 | Groshong |
| 6,665,013 | B1 | 12/2003 | Fossum et al. |
| 6,954,163 | B2 | 10/2005 | Toumazou |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,141,784 | B2 | 3/2012 | Wang |
| 8,204,004 | B2 | 6/2012 | Hamamoto |
| 8,279,180 | B2 | 10/2012 | Hotelling et al. |
| 8,547,114 | B2 | 10/2013 | Kremin |
| 8,625,726 | B2 | 1/2014 | Kuan |
| 9,182,808 | B1 | 11/2015 | Jones |
| 9,201,547 | B2 | 12/2015 | Elias |
| 9,276,870 | B2 | 3/2016 | Testa |
| 9,686,609 | B1 | 6/2017 | O'Connor et al. |
| 9,843,936 | B2 | 12/2017 | Fan |
| 10,554,215 | B1 | 2/2020 | McGibney |
| 2003/0052657 | A1 | 3/2003 | Koernle et al. |
| 2005/0235758 | A1 | 10/2005 | Kowal et al. |
| 2008/0036636 | A1 | 2/2008 | Khorram |
| 2008/0320293 | A1 | 12/2008 | Rofougaran |
| 2009/0006675 | A1 | 1/2009 | Rofougaran |
| 2010/0157920 | A1 | 6/2010 | Choi |
| 2010/0211921 | A1 | 8/2010 | Hu et al. |
| 2011/0063154 | A1 | 3/2011 | Hotelling et al. |
| 2011/0298745 | A1 | 12/2011 | Souchkov |
| 2013/0278447 | A1 | 10/2013 | Kremin |
| 2016/0056832 | A1 | 2/2016 | Deloge |
| 2016/0188049 | A1 | 6/2016 | Yang et al. |
| 2018/0157354 | A1 | 6/2018 | Blondin et al. |
| 2018/0183139 | A1 | 6/2018 | Liu |
| 2018/0275824 | A1 | 9/2018 | Li |
| 2019/0171331 | A1 | 6/2019 | Gray et al. |

FOREIGN PATENT DOCUMENTS

| | | |
|---|---|---|
| EP | 2284637 A1 | 2/2011 |
| KR | 102032325 B1 | 10/2019 |

OTHER PUBLICATIONS

Baker; How delta-sigma ADCs work, Part 1; Analog Applications Journal; Oct. 1, 2011; 6 pgs.

Brian Pisani, Digital Filter Types in Delta-Sigma ADCs, Application Report SBAA230, May 2017, pp. 1-8, Texas Instruments Incorporated, Dallas, Texas.

International Searching Authority; International Search Report and Written Opinion; International Application No. PCT/US2020/013320; Apr. 14, 2020; 8 pgs.

International Searching Authority; International Search Report and Written Opinion; International Application No. PCT/US2020/058353; Mar. 5, 2021; 7 pgs.

data communication system 10 data communication system 10 computing device 12 wireless computing device 14 drive-sense circuit 106 drive-sense circuit 106

LVDC 26

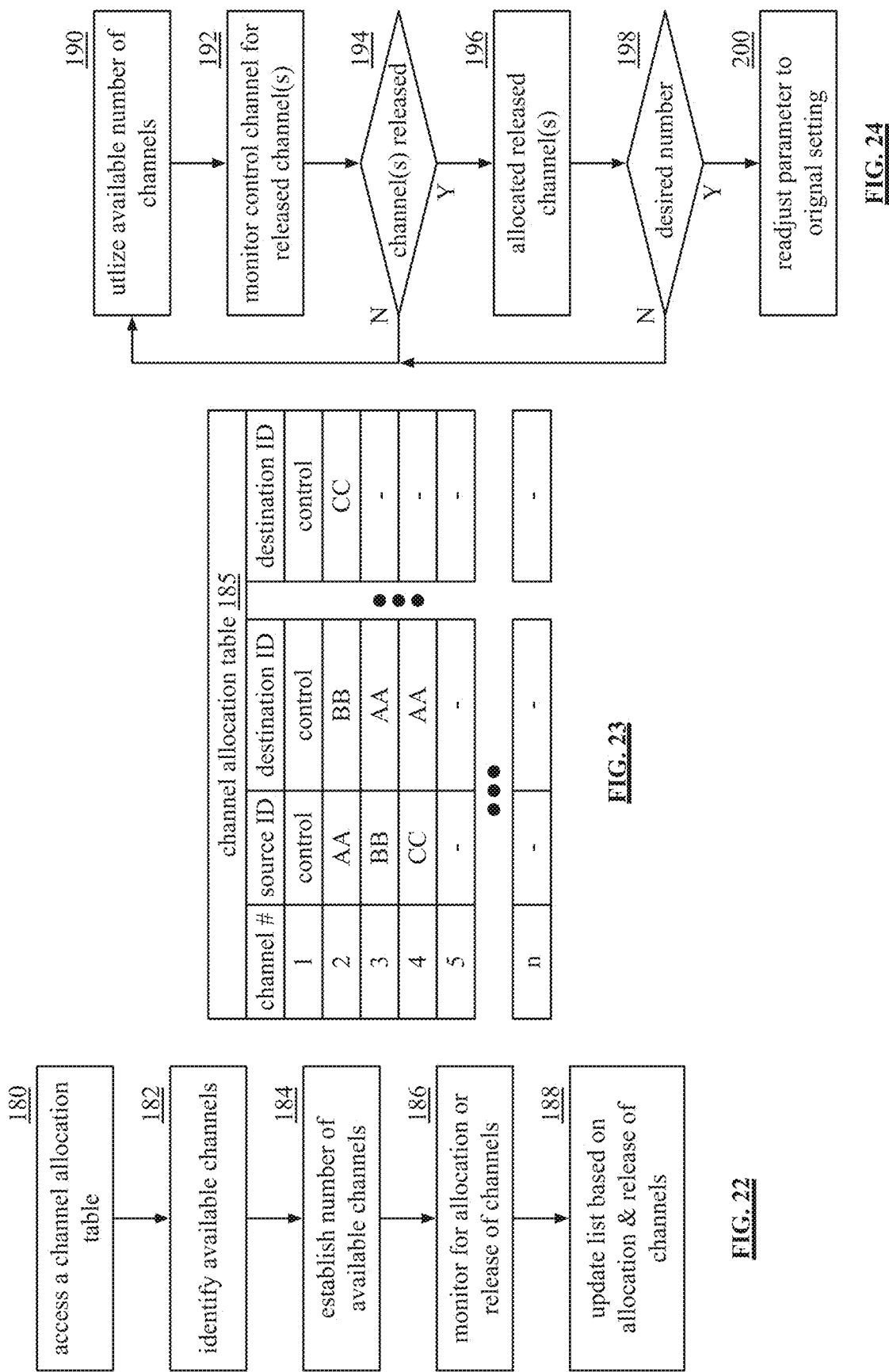

DATA CONVEYANCE AND COMMUNICATION OF THREE OR MORE LVDC ENABLED DEVICES

CROSS REFERENCE TO RELATED APPLICATIONS

The present U.S. Utility Patent Application claims priority pursuant to 35 U.S.C. § 120 as a continuation of U.S. Utility application Ser. No. 17/649,907, entitled "DATA CONVEYANCE AND COMMUNICATION FOR THREE OR MORE LVDC ENABLED DEVICES," filed Feb. 3, 2022, which claims priority pursuant to 35 U.S.C. § 120 as a continuation of U.S. Utility application Ser. No. 17/520,447, entitled "MULTIPLE COMMUNICATION CHANNEL ALLOCATION FOR LOW VOLTAGE DRIVE CIRCUITS," filed Nov. 5, 2021, issued as U.S. Pat. No. 11,580,045, on Feb. 14, 2023, which claims priority pursuant to 35 U.S.C. § 120 as a continuation of U.S. Utility application Ser. No. 17/093,101, entitled "CHANNEL ALLOCATION AMONG LOW VOLTAGE DRIVE CIRCUITS," filed Nov. 9, 2020, issued as U.S. Pat. No. 11,169,948, on Nov. 9, 2021, which claims priority pursuant to 35 U.S.C. § 120 as a continuation of U.S. Utility application Ser. No. 16/247,164, entitled "CHANNEL ALLOCATION AMONG LOW VOLTAGE DRIVE CIRCUITS," filed Jan. 14, 2019, issued as U.S. Pat. No. 10,831,690, on Nov. 10, 2020, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sending and receiving data via a common bus.

Description of Related Art

Data communication involves sending data from one device to another device via a communication medium (e.g., a wire, a trace, a twisted pair, a coaxial cable, air, etc.). The devices range from dies within an integrated circuit (IC), to ICs on a printed circuit board (PCB), to PCBs within a computer, to computers, to networks of computers, and so on.

Data is communicated via a wired and/or a wireless connection and is done so in accordance with a data communication protocol. Data communication protocols dictate how the data is to be formatted, encoded/decoded, transmitted, and received. For example, a wireless data communication protocol such as IEEE 802.11 dictates how wireless communications are to be done via a wireless local area network. As another example, Sony/Philips Digital Interface Format (SPDIF) dictates how digital audio signals are transmitted and received. As yet another example, Inter-Integrated Circuit (I²C) is a two-wire serial protocol to connect devices such as microcontrollers, digital to analog converters, analog to digital converters, peripheral devices to a computer, and so on.

In addition, data communication protocols dictate how transmission errors are to be handled. For example, wireless communications often experience data errors, so the protocol dictates a form of forward error correction (e.g., Reed Solomon encoding, Turbo encoded, etc.) be used. As another example, wired communications experience much less data errors than wireless communications so the protocol dictates a form of feedback error correction (e.g., resend request, etc.) be used.

For some data communications, digital data is modulated with an analog carrier signal and transmitted/received via a modulated radio frequency (RF) signal. For other data communications, the digital data is transmitted "as is" via a wire or metal trace on a PCB. Regardless of the data communication protocol, digital data is in binary form where a logic "1" value is represented by a voltage that is at least 90% of the positive rail voltage and a logic "0" is represented by a voltage it is at most 10% of the negative rail voltage.

BRIEF DESCRIPTION OF THE SEVERAL VIEWS OF THE DRAWING(S)

FIG. 22 is a logic diagram of an example of a method for utilizing a channel allocation table for communication between Low Voltage Drive Circuits (LVDCs) in accordance with the present invention;

FIG. 23 is a schematic block diagram of an example of a channel allocation table for supporting communications between Low Voltage Drive Circuits (LVDCs) in accordance with the present invention;

FIG. 24 is a logic diagram of an example of a method for obtaining more channels to support a communication between Low Voltage Drive Circuits (LVDCs) in accordance with the present invention;

DETAILED DESCRIPTION OF THE INVENTION

Figure 1:
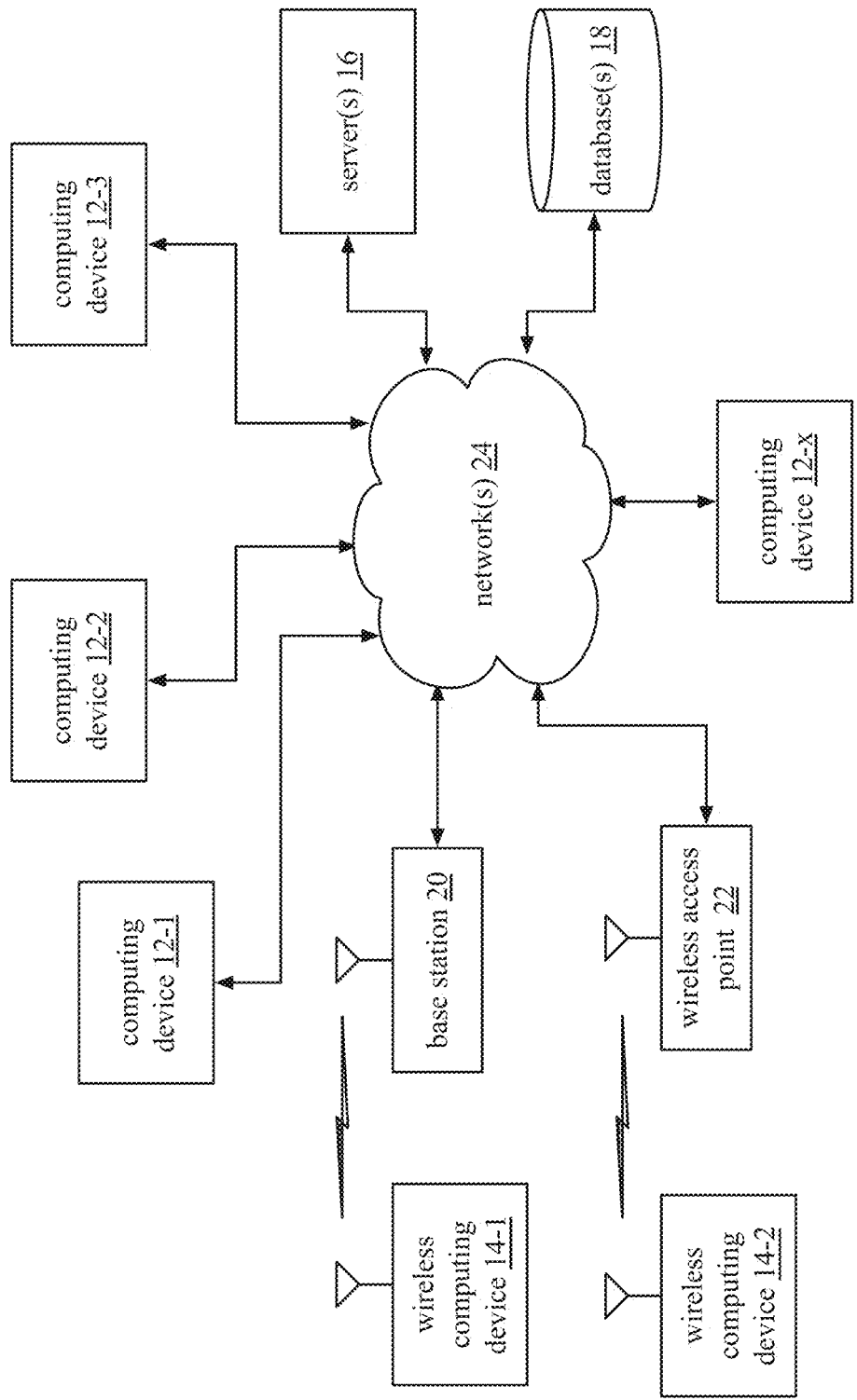
FIG. 1 is a schematic block diagram of an embodiment of a data communication system in accordance with the present invention.

FIG. 1 is a schematic block diagram of an embodiment of a data communication system 10 that includes a plurality of computing devices 12, a plurality of wireless computing devices 14, one or more servers 16, one or more databases 18, one or more networks 24, one or more base stations 20, and/or one or more wireless access points 22. Embodiments of computing devices 12 and 14 are similar in construct and/or functionality with a difference being the computing devices 12 couple to the network(s) 24 via a wired network card and the wireless communication devices 14 coupled to the network(s) via a wireless connection. In an embodiment, a computing device can have both a wired network card and a wireless network card such that it is both computing devices 12 and 14.

A computing device 12 and/or 14 may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12 and 14 will be discussed in greater detail with reference to one or more of FIGS. 3-4.

A server 16 is a special type of computing device that is optimized for processing large amounts of data requests in parallel. A server 16 includes similar components to that of the computing devices 12 and/or 14 with more robust processing modules, more main memory, and/or more hard drive memory (e.g., solid state, hard drives, etc.). Further, a server 16 is typically accessed remotely; as such it does not generally include user input devices and/or user output devices. In addition, an embodiment of a server is a stand-alone separate computing device and/or may be a cloud computing device.

A database 18 is a special type of computing device that is optimized for large scale data storage and retrieval. A database 18 includes similar components to that of the computing devices 12 and/or 14 with more hard drive memory (e.g., solid state, hard drives, etc.) and potentially with more processing modules and/or main memory. Further, a database 18 is typically accessed remotely; as such it does not generally include user input devices and/or user output devices. In addition, an embodiment of a database 18 is a standalone separate computing device and/or may be a cloud computing device.

The network(s) 24 includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

The computing devices 12, the wireless communication devices 14, the server 16, the database 18, the base station 20, and/or the wireless access point 22 include one or more low voltage drive circuits (LVDC) for communicating data via a line of a bus (e.g., a bus includes one or more lines, each line is a wired connection, a wire, a trace on a PCB, etc.). The data communication is between devices and/or is within a device. For example, two computing devices communicate with each other via their respective LVDCs. As another example, components within a computing device have associated LVDCs and the components communicate data via the LVDCs.

Figure 2:
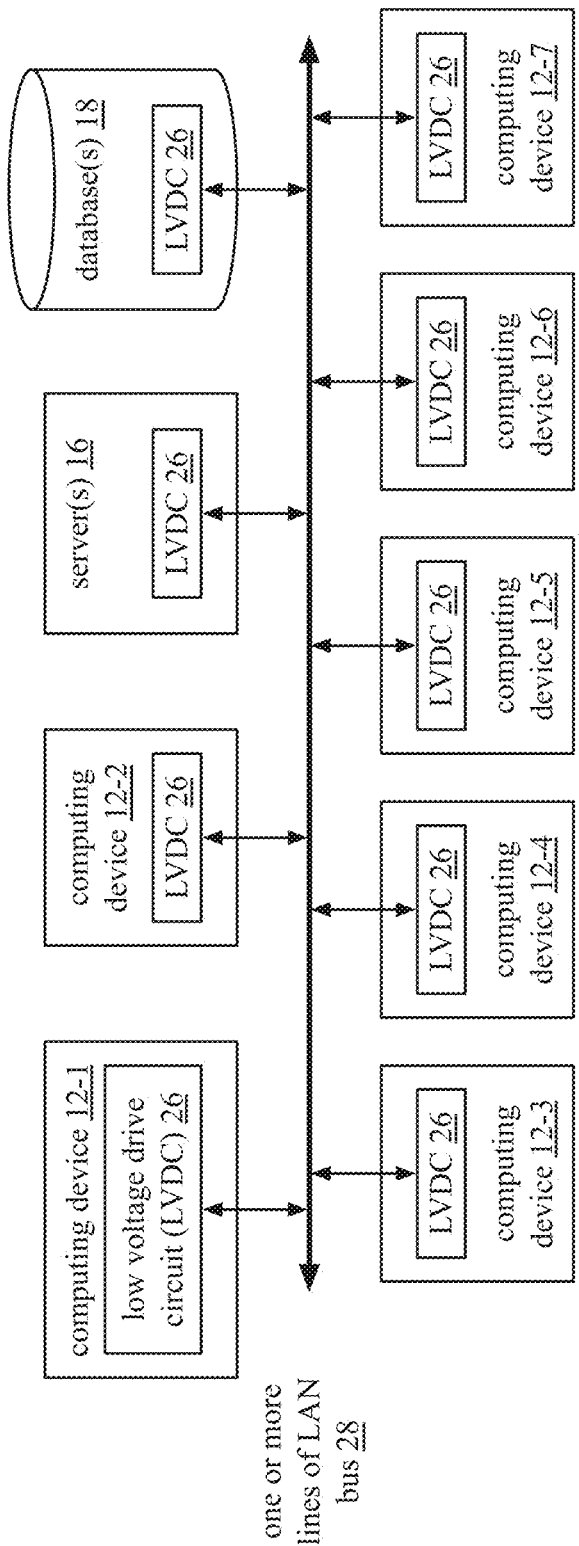
FIG. 2 is a schematic block diagram of another embodiment of a data communication system in accordance with the present invention.

FIG. 2 is a schematic block diagram of another embodiment of a data communication system 10 that includes the computing devices 12, the server 16, and the database 18 coupled to one or more lines of a LAN bus 28. Each device 12, 16, and 18 includes one or more LVDCs 26 for communicating data via the line of the LAN bus 28.

An LVDC 26 functions to convert transmit digital data from its host device into an analog transmit signal. As an example, a host device is a computing device, a server, or a database. As another example, a host device is an interface of one the computing device, the server, or the database. As yet another example, a host device is an integrated circuit of the computing device, the server, or the database. As a further example, a host device is a die of an integrated circuit.

The LVDC 26 produces the analog transmit signal to have an oscillating component at a given frequency that represents the transmit digital data and to have a very low magnitude. For example, the magnitude of the oscillating component is between five percent and 75 percent of the rail to rail voltage (or current) of the LVDC (e.g., Vdd–Vss of the LVDC). By keeping the magnitude of the oscillating component very low with respect to the rail to rail voltage (or current), data is transmitted with very low power and very good noise immunity. As a specific example, if the voltage magnitude of the oscillating component is 25 mV (milli-volts) and the current is 0.1 mA (milli-amps), then the power is 2.5 μW (micro-watts).

The LVDC 26 also functions to convert an analog receive signal into received digital data that is provided to its host. The analog receive signal is an analog transmit signal from another LVDC of the same host or a different host and is received from the same line of the bus as which the LVDC transmits its analog transmit signal. For an LVDC, the analog receive signal is at the same frequency as its analog transmit signal for half duplex communication and is at a different frequency for full duplex communication.

An LVDC 26 is capable of communicating data with one or more other LVDCs using a plurality of frequencies. Each frequency supports a conveyance of data. For example, the transmit digital data can be divided up into data streams, where each data stream is transmitted on a different frequency of the analog transmit signal. This increases the data rate per line of the bus with very little increase in power. One or more other LVDCs can receive the multiple frequencies of the analog transmit signal, recover the data streams, and recover the transmitted digital data.

Figure 3:
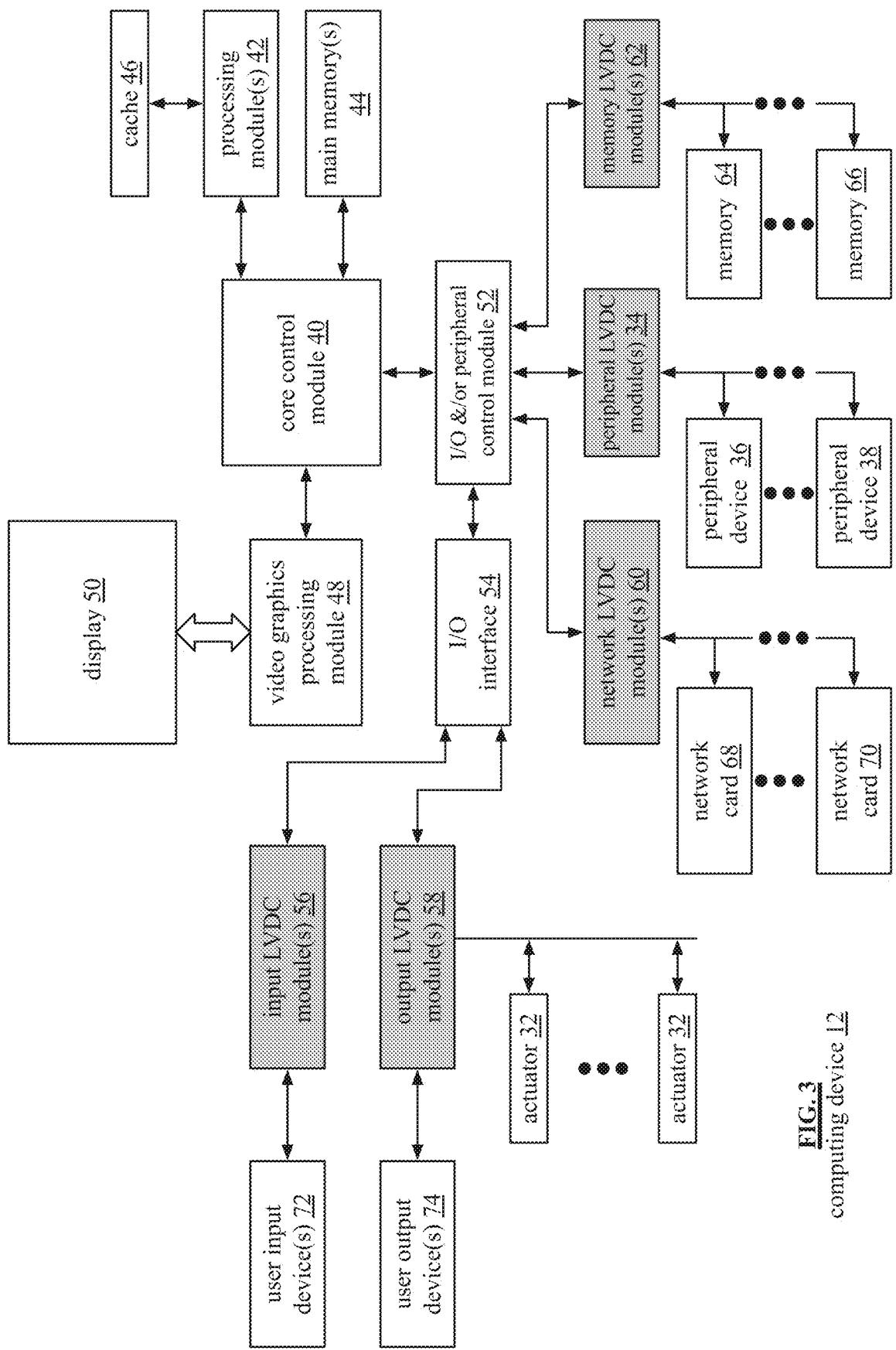
FIG. 3 is a schematic block diagram of an embodiment of a computing device in accordance with the present invention.

FIG. 3 is a schematic block diagram of an embodiment of a computing device 12 that includes a core control module 40, one or more processing modules 42, one or more main memories 44 (e.g., volatile memory), cache memory 46, a video graphics processing module 48, a display 50, an Input-Output (I/O) and/or peripheral control module 52, one or more input LVDC modules 56, one or more output LVDC modules 58, one or more network LVDC modules 60, one or more peripheral LVDC modules 34, and one or more memory LVDC modules 62. A processing module 42 is described in greater detail at the end of the detailed description of the invention section and, in an alternative embodiment, has a direct connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 (i.e., non-volatile memory) includes one or more hard drives, one or more solid state memory chips, and/or one or more other large capacity storage devices that, in comparison to cache memory and main memory devices, is/are relatively inexpensive with respect to cost per amount of data stored. The memory 64-66, which includes an LVDC, is coupled to the core control module 40 via the I/O and/or peripheral control module 52 and via one or more memory LVDC modules 62. In an embodiment, the I/O and/or peripheral control module 52 includes one or more Peripheral Component Interface (PCI) buses to which peripheral components connect to the core control module 40. A memory LVDC module 62 includes a software driver and hardware as discussed in one or more subsequent Figures.

The core control module 40 coordinates data communications between the processing module(s) 42 and the network(s) 24 via the I/O and/or peripheral control module 52, the network LVDC module(s) 60, and a network card 68 or 70. A network card 68 or 70 includes an LVDC and a wired communication unit. A wired communication unit includes a Gigabit LAN connection, a Firewire connection, and/or a proprietary computer wired connection. A network LVDC module 60 includes a software driver and hardware as discussed in one or more subsequent Figures.

The core control module 40 coordinates data communications between the processing module(s) 42 and the user input device(s) 72 via the input LVDC module(s) 56 and the I/O and/or peripheral control module 52. A user input device 72 includes an LVDC and further includes one or more of a keypad, a keyboard, control switches, a touchpad, a microphone, a camera, etc. An input LVDC module 56 includes a software driver and hardware as discussed in one or more subsequent Figures.

The core control module 40 coordinates data communications between the processing module(s) 42 and the user output device(s) 74 via the output LVDC module(s) 58 and the I/O and/or peripheral control module 52. A user output device 74 includes an LVDC and a speaker, a tactile actuator, etc. An output LVDC module 58 includes a software driver and hardware as discussed in one or more subsequent Figures.

The core control module 40 coordinates data communications between the processing module(s) 42 and peripheral devices 36 and 38 via the I/O and/or peripheral control module 52 and the peripheral LVDC module(s) 34. A peripheral device 36 or 38 includes an external hard drive, a headset, a speaker, a microphone, a thumb drive, a camera, etc. A peripheral LVDC module 34 includes a software driver and hardware as discussed in one or more subsequent Figures.

The core control module 40 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50. While not shown, the computing device 12 further includes a BIOS (Basic Input Output System) memory coupled to the core control module 40.

Figure 4:
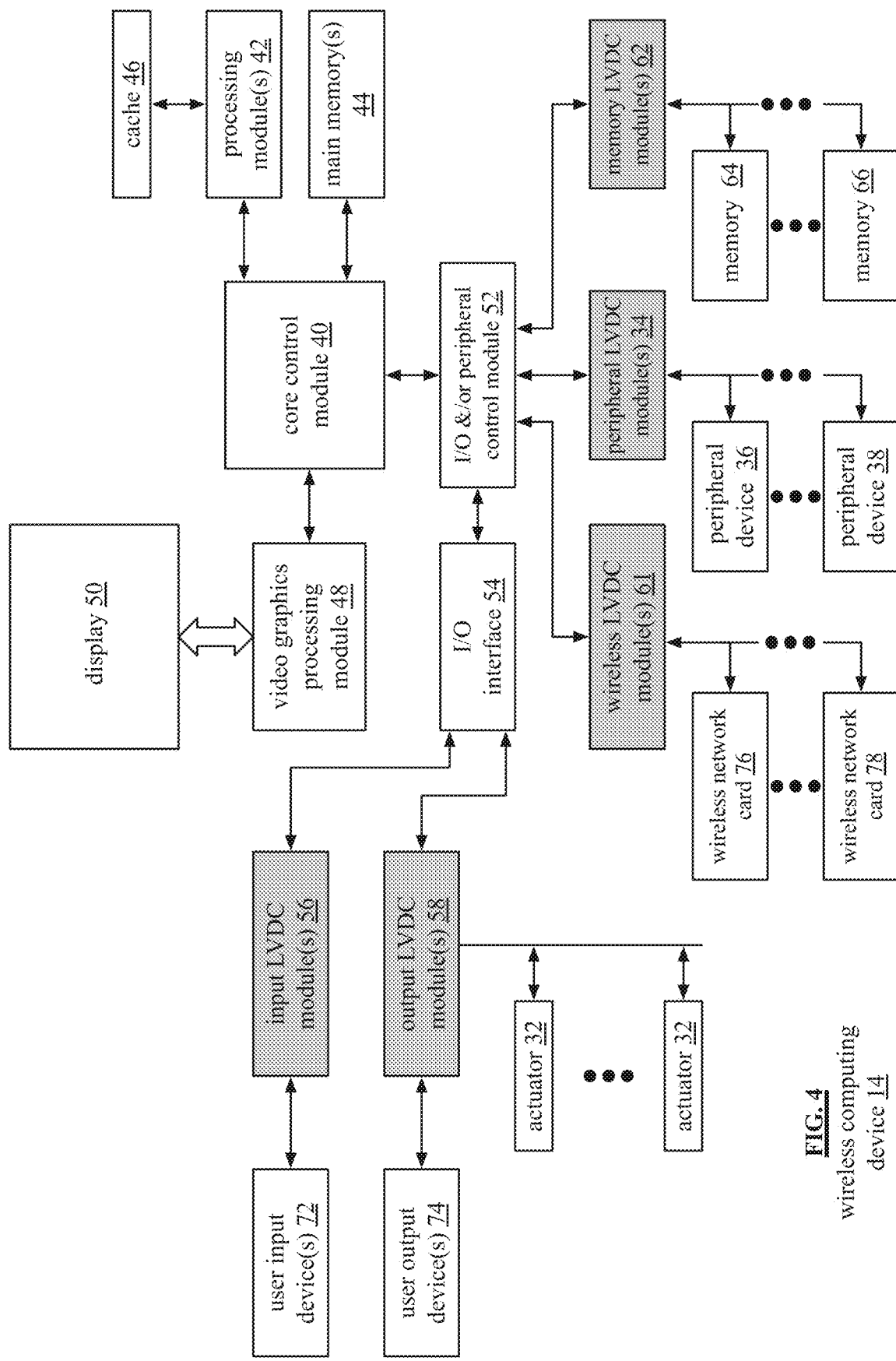
FIG. 4 is a schematic block diagram of an embodiment of a wireless computing device in accordance with the present invention.

FIG. 4 is a schematic block diagram of an embodiment of a wireless computing device 14 that includes a core control module 40, one or more processing modules 42, one or more main memories 44 (e.g., volatile memory), cache memory 46, a video graphics processing module 48, a display 50, an Input-Output (I/O) and/or peripheral control module 52, one or more input LVDC modules 56, one or more output LVDC modules 58, one or more wireless network LVDC modules 61, and one or more memory LVDC modules 62. The common components of the wireless computing device 14 and the computing device 12 function as discussed with reference to FIG. 3. In this embodiment, communication with the network 24 is done wirelessly.

In particular, the core control module 40 coordinates data communications between the processing module(s) 42 and network(s) 24 wirelessly via the I/O and/or peripheral control module 52, the wireless network LVDC module(s) 61, and a wireless network card 76 or 78. A wireless network card 76 or 78 includes an LVDC and a wireless communication unit. A wireless communication unit includes a wireless local area network (WLAN) communication device, a cellular communication device, a Bluetooth device, and/or a ZigBee communication device. A wireless network interface module 61 includes a software driver and hardware as discussed in one or more subsequent Figures.

Figure 5:
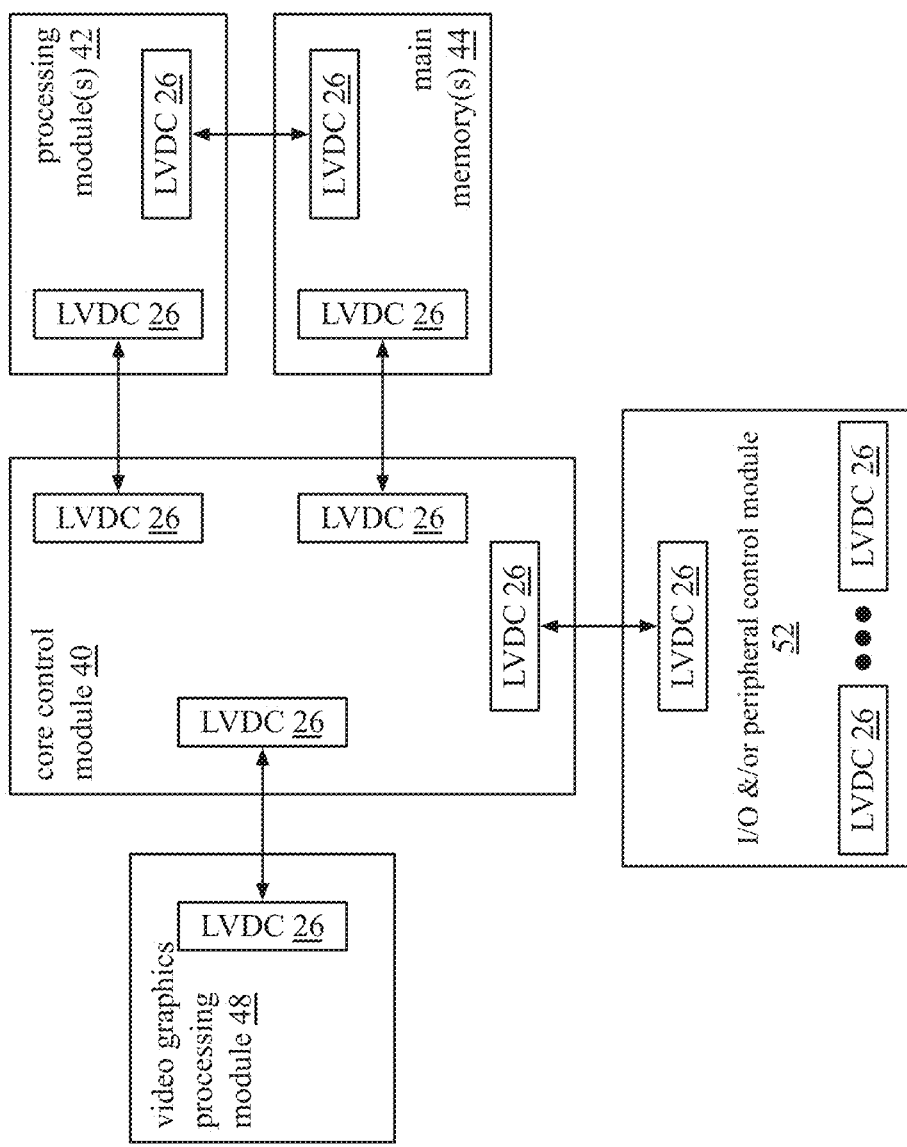
FIG. 5 is a schematic block diagram of an embodiment of a computing core of a computing device in accordance with the present invention.

FIG. 5 is a schematic block diagram of an embodiment of a computing core of a computing device 12 or 14. The computing core includes the core control module 40, the processing module(s) 42, the main memory 44, the video graphics processing module 48, and the IO and/or peripheral control module 52. These components are generally implemented as integrated circuits (ICs) and mounted on a mother board. The mother board includes traces that form buses for data to be communicated between the components.

In this embodiment, the data communication between components 40-52 is done via Low Voltage Drive Circuits (LVDCs). Each component 40-52 includes one or more LVDCs for communicating with one or more other components. For example, the core control module 40 includes four LVDCs: A first LVDC for one-to-one communication with the processing module 42; a second LVDC for one-to-one communication with the main memory 44; a third LVDC for one-to-one communication with the video graphics processing module 48; and a fourth LVDC for one-to-one communication with the IO and/or peripheral control module 52.

In this embodiment, the core control module 40 is coupled to the processing module 42 via a single trace for data communication there-between. The core control module 40 is also coupled, via a single trace, to the main memory 44, the video graphics processing module 48, and to the IO and/or peripheral control module 52. Similarly, the processing module 42 is coupled to the main memory via a single trace. In this manner, the number of traces on the mother board is substantially reduced in comparison to mother boards that use conventional data communication between the components. In addition, the power to convey data is substantially reduced in the present embodiment in comparison to mother boards that use conventional data communication.

In an alternate embodiment, each of the core control module 40, the processing module(s) 42, the main memory 44, the video graphics processing module 48, and the IO and/or peripheral control module 52 includes one LVDC that is coupled to one or more lines of a bus. In an example, the core control module 40 communicates with the processing module 42 using a first set of channels of a frequency band; communicates with main memory 44 using a second set of channels of the frequency band; communicates with the video graphics processing module 48 using a third set of channels of the frequency band; and communicates with the IO and/or peripheral control module 52 using a fourth set of channels of the frequency band. As an example, the frequency band ranges from 1.000 GHz to 1.100 GHz with channels at frequencies every 10 MHz. As such, there are 11 channels: the first at 1.000 GHz, the second at 1.010 GHz, and so on through the eleventh at 1.100 GHz. A specific channel includes a sinusoidal signal at a particular frequency within the frequency band.

In another example of alternative embodiment, the channels are allocated to the components on an as needed basis. For example, when the main memory has data to write to memory device(s) via the IO and/or peripheral control module 52, one or more channels are allocated for this communication. When the data has been conveyed, the allocated channels are released for reallocation to another communication.

Figure 6:
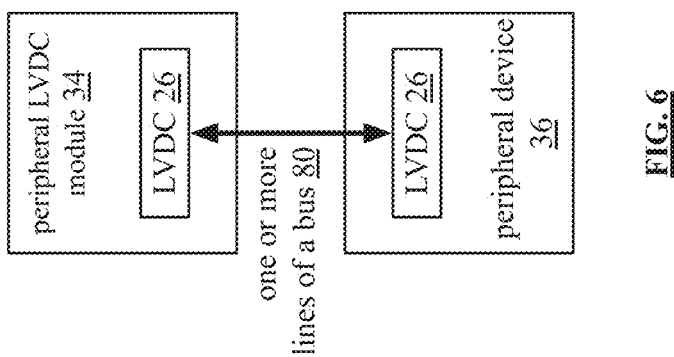
FIG. 6 is a schematic block diagram of an embodiment of a peripheral Low Voltage Drive Circuit (LVDC) module of a computing device coupled to a peripheral device in accordance with the present invention.

FIG. 6 is a schematic block diagram of an embodiment of a peripheral Low Voltage Drive Circuit (LVDC) module 34 of a computing device 12 coupled to a peripheral device 36 via LVDCs 26. The LVDCs are coupled together via one or more lines of a bus 80. The devices communicate data in a full duplex mode per line using multiple channels or in a half-duplex mode per line using a single channel. For example, the LVDC of peripheral LVDC module 34 uses channels 1-3 (e.g., frequencies 1-3 of the frequency band) to transmit data to the LVDC of the peripheral device 36. In addition, the LVDC of the peripheral device 36 uses channels 4-6 (e.g., frequencies 4-6 of the frequency band) to transmit data to the LVDC of the peripheral LVDC module 34. The bus 80 includes one or more lines, where a line is metal trace on a printed circuit board, a wire, or other form of electrical conductor. The number of lines per bus range from 1 to 2N, where N is an integer greater than or equal to 1.

Figure 7:
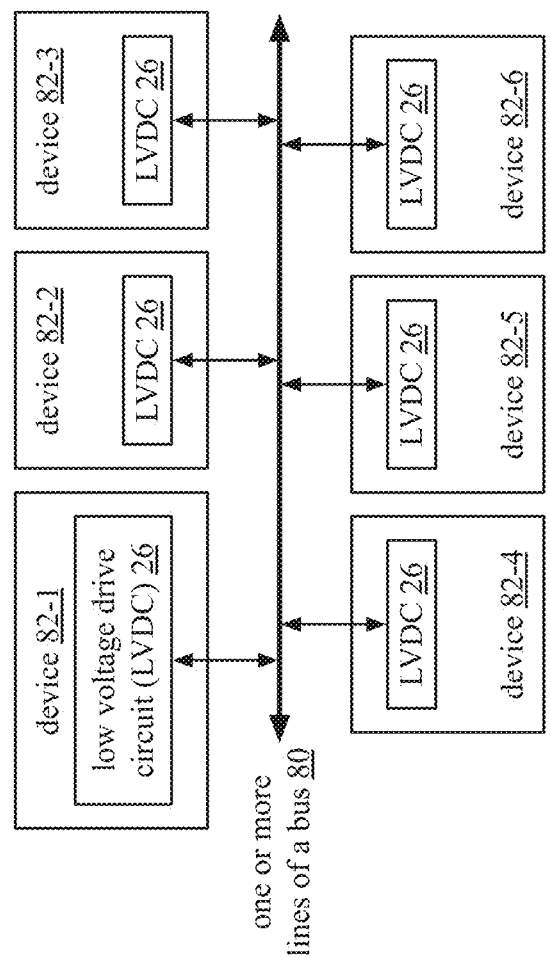
FIG. 7 is a schematic block diagram of another embodiment of a data communication system in accordance with the present invention.

FIG. 7 is a schematic block diagram of another embodiment of a data communication system that includes a plurality of devices 82-1 through 82-6. Each of the devices includes a Low Voltage Drive Circuit (LVDC) 26 coupled to one or more lines of a bus 80. The devices are one or more devices from a list that includes a die of an integrated circuit (IC), an integrated circuit (IC), a printed circuit board with components mounted thereon, and a sub-system of a plurality of printed circuit boards.

The devices communicate with each other via their respective LVDCs and the one or more lines of the bus. For each line of the bus, the LVDCs are assigned (e.g., permanently, on an as needed basis, etc.) channels to transmit data to one or more other devices. An LVDC of a device is tuned to the channel(s) of another device to receive the data transmissions from the other device.

Figure 8:
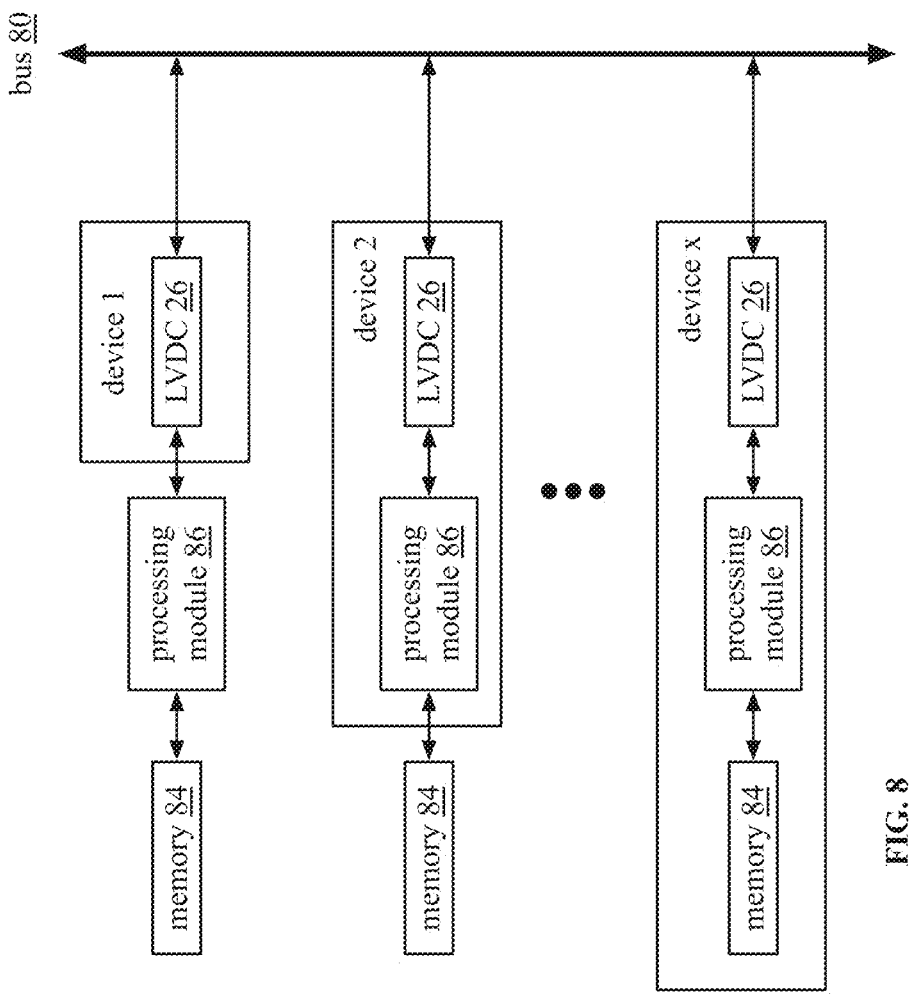
FIG. 8 is a schematic block diagram of another embodiment of a data communication system in accordance with the present invention.

FIG. 8 is a schematic block diagram of another embodiment of a data communication system that includes a plurality of devices 1-*x*. Each of the devices includes a Low Voltage Drive Circuit (LVDC) 26 coupled to one or more lines of a bus 80. The types of devices vary. For example, device 1 is an interface device that includes a limited amount of additional circuitry beyond the LVDC 26. In particular, device 1 does not include a processing module 86 or memory 84 (e.g., volatile or non-volatile memory). Device 1 is coupled to the processing module 86 of a next level higher component of a computing device. The processing module 86 coupled to device 1 is also coupled to memory 84.

Device 2 includes the LVDC and the processing module 86. The memory 84, however, is associated with the next higher component of the computing device. Device x includes the LVDC, the processing module 86, and the memory 84. As an example, the bus 84 is a backplane of server; device 1 is an interface for a thumb drive; device 2 is a video graphics card, and device x is a mother board. Regardless of the specific implementation of a device including an LVDC, a driver for the LVDC is stored in the memory 84.

Figures 9, 10:
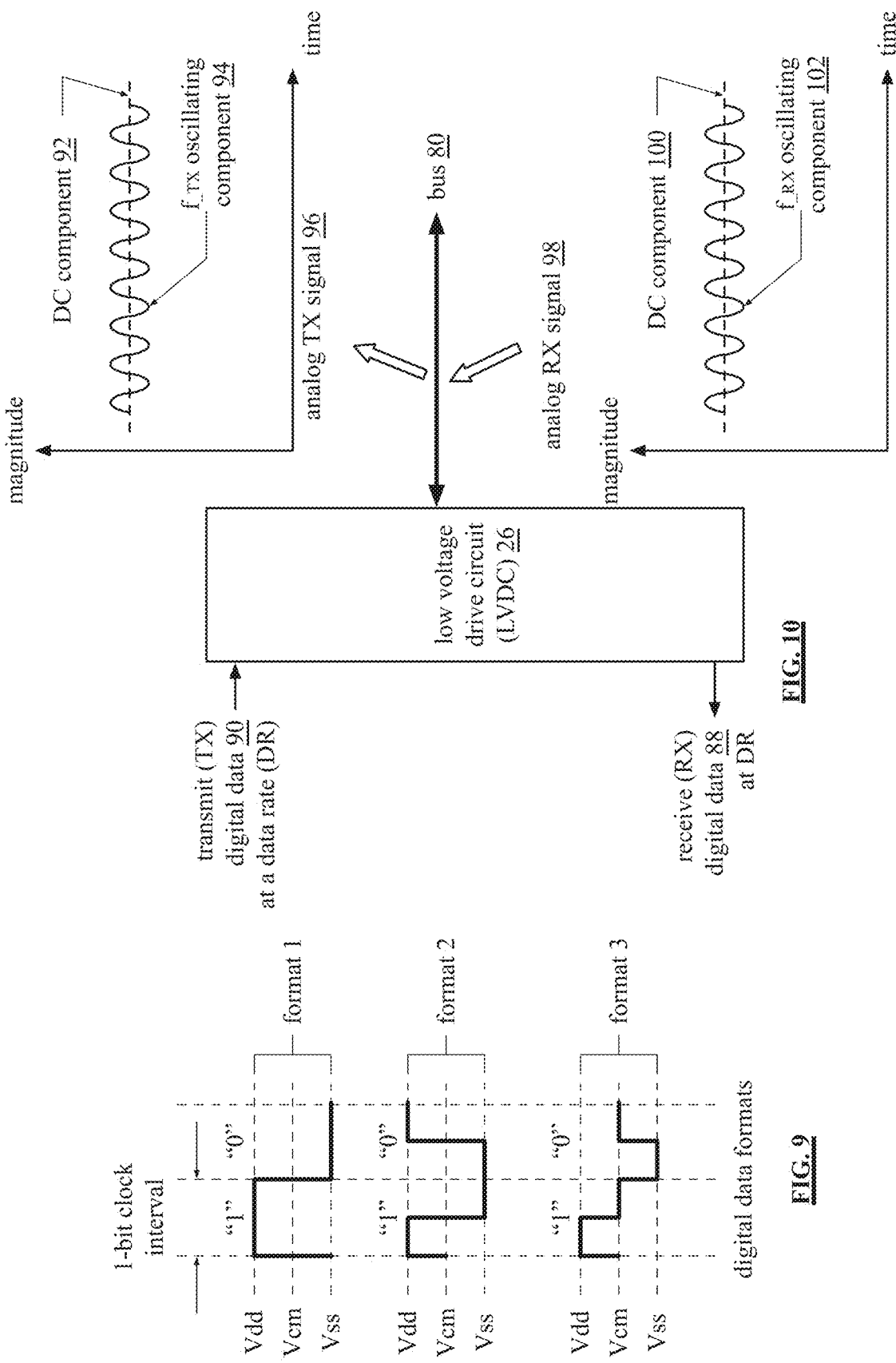
FIG. 9 is a schematic block diagram of examples of digital data formats.
FIG. 10 is a functional diagram of an embodiment of a Low Voltage Drive Circuit (LVDC) in accordance with the present invention.

FIG. 9 is a schematic block diagram of examples of digital data formats. As known, digital data is a string of binary values. A binary value is either a logic "1" or a logic "0". One binary value corresponds to a bit of the digital data. How the bits are organized into data words establishes the meaning for the data words. For example, American Standard Code for Information Interchange (ASCII) defines characters using 8-bits of data. For example, a capital "A" is represented as the binary value of 0100 0001 and a lower case "a" is represented as the binary value of 0110 0001.

A binary value can be expressed in a variety of forms. In a first example format, a logic "1" is expressed as a positive rail voltage for the duration of a 1-bit clock interval and logic "0" is expressed as a negative rail voltage for the duration of the 1-bit clock interval; or vice versa. The positive rail voltage refers to a positive supply voltage (e.g., Vdd) that is provided to a digital circuit (e.g., a circuit that processes and/or communicates digital data as binary values), the negative rail voltage refers to a negative supply voltage or ground (e.g., Vss) that is provided to the digital circuit, and the common mode voltage (e.g., Vcm) is half way between Vdd and Vss. The 1-bit clock interval corresponds to the inverse of a 1-bit data rate. For example, if the 1-bit data rate is 1 Giga-bit per second (Gbps), then the 1-bit clock interval is 1 nano-second).

In a second example format, a logic "1" is expressed as a non-return to zero waveform that, for the first half of the 1-bit interval, is at the positive rail voltage (Vdd) and for the second half of the 1-bit interval is at the negative rail voltage (Vss). A logic "0" is expressed as a non-return to zero waveform that, for the first half of the 1-bit interval, is at the negative rail voltage (Vss) and for the second half of the 1-bit interval is at the positive rail voltage (Vdd). Alternatively, a logic "0" is expressed as a non-return to zero waveform that, for the first half of the 1-bit interval, is at the positive rail voltage (Vdd) and for the second half of the 1-bit interval is at the negative rail voltage (Vss). A logic "1" is expressed as a non-return to zero waveform that, for the first half of the 1-bit interval, is at the negative rail voltage (Vss) and for the second half of the 1-bit interval is at the positive rail voltage (Vdd).

In a third example format, a logic "1" is expressed as a return to zero waveform that, for the first half of the 1-bit interval, is at the positive rail voltage (Vdd) and for the second half of the 1-bit interval is at the common mode voltage (Vcm). A logic "0" is expressed as a return to zero waveform that, for the first half of the 1-bit interval, is at the negative rail voltage (Vss) and for the second half of the 1-bit interval is at the common mode voltage (Vcm). Alternatively, a logic "0" is expressed as a return to zero waveform that, for the first half of the 1-bit interval, is at the positive rail voltage (Vdd) and for the second half of the 1-bit interval is at the common mode voltage (Vcm). A logic "1" is expressed as a return to zero waveform that, for the first half of the 1-bit interval, is at the negative rail voltage (Vss) and for the second half of the 1-bit interval is at the common mode voltage (Vcm).

With any of the digital data formats, a logic value needs to be within 10% of a respective rail voltage to be considered in a steady data binary condition. For example, for format 1, a logic 1 is not assured until the voltage is at least 90% of the positive rail voltage (Vdd). As another example, for format 1, a logic 0 is not assured until the voltage is at most 10% of the negative rail voltage (Vss).

FIG. 10 is a functional diagram of an embodiment of a Low Voltage Drive Circuit (LVDC) 26. In general, the LVDC 26 functions to convert transmit (TX) digital data 90 into an analog transmit signal 96 and to convert an analog receive signal 98 into receive (RX) digital data 88. The LVDC 26 receives the transmit digital data 90 from its host device and transmits the analog TX signal 96 to another LVDC coupled to the line of the bus 80. The analog transmit signal 96 includes a DC component 92 and an oscillating component 94. The oscillating component 94 includes data encoded into one or more channels of a frequency band and has a very low magnitude (e.g., 5% to 75% of the rail to rail voltage and/or current powering the LVDC and/or the host device). This allows for low power high data rate communications in comparison to conventional low voltage signaling protocols.

As an example, the transmit digital data is encoded into one channel, as such the oscillating component includes one frequency: the one corresponding to the channel. As another example, the transmit digital data is divided into x number of data streams. The LVDC encodes the x number of data streams on to x number of channels. Thus, the oscillating component 94 includes x number of frequencies corresponding to the x number of channels.

The LVDC 26 receives the analog receive signal 98 from another LVDC (e.g., the one it sent its analog TX signal to and/or another LVDC coupled to the line of the bus 80). The analog receive signal 98 includes a DC component 100 and a receive oscillating component 102. The receive oscillating component 102 includes data encoded into one or more channels of a frequency band by the other LVDC and has a very low magnitude. The LVDC converts the analog receive signal 98 into the receive digital data 88, which it provides to its host device.

Figure 11:
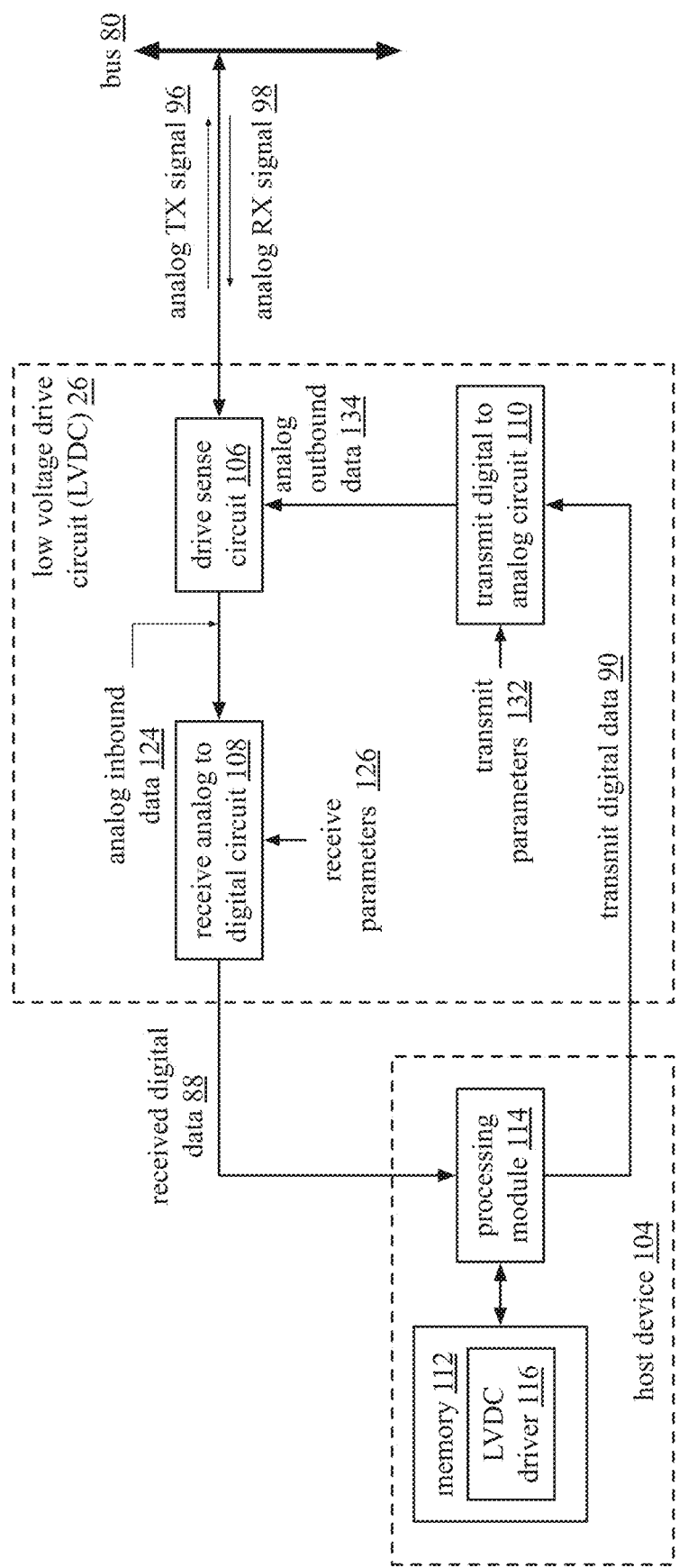
FIG. 11 is a schematic block diagram of an embodiment of a Low Voltage Drive Circuit (LVDC) coupled to a host device in accordance with the present invention.

FIG. 11 is a schematic block diagram of an embodiment of a Low Voltage Drive Circuit (LVDC) 26 coupled to a host device 104 and to one or more lines of a bus 80. The host device 104 includes a processing module 114 and memory 112 (e.g., volatile memory and/or non-volatile memory). The memory 112 stores at least part of an LVDC driver 116 application. The LVDC 26 includes a drive sense circuit 106, a receive analog to digital converter (ADC) circuit 108, and a transmit digital to analog converter (DAC) circuit 110.

In an example of operation, the processing module 104 of the host device 104 accesses the LVDC driver 116 to set up the LVDC 26 for operation. For example, the LVDC driver 116 includes operational instructions and parameters that enable the host device 104 to effectively use the LVDC for data communications. For example, the parameters include two or more of: one or more communication scheme parameters; one or more data conveyance scheme parameters, one or more receive parameters, and one or more transmit parameters. A communication scheme parameter is one of: independent communication (e.g., push data to other device without prompting from other device); dependent communication (e.g., push or pull data to or from other device with coordination between the devices); one to one communication; one to many communication; many to one communication; many to many communication; half duplex communication; and full duplex communication.

A data conveyance scheme parameter is one of: a data rate per line; a number of bits per data rate interval; data coding scheme per line and per number of bits per data rate interval; direct data communication; modulated data communication; power level of signaling per line of the bus; voltage/current level for a data coding scheme per line (e.g., function of signal to noise ratio, power level, and data rate); number of lines in the bus; and a number of lines of the bus to use.

A receive parameter includes one of: a digital data format for the received digital data; a packet format for the received digital data; analog to digital conversion scheme in accordance with parameter(s) of the communication scheme and of the data conveyance scheme of transmitted data by other LVDCs; and digital filtering parameters (e.g., bandwidth, slew rate, center frequency, digital filter coefficients, number of taps of digital filtering, stages of digital filtering, etc.).

A transmit parameter includes one of: a digital data format for the transmit digital data; a packet format for the transmit digital data; and digital to analog conversion in accordance with parameter(s) of the communication scheme and of the data conveyance scheme.

Once the LVDC 26 is set up for a particular data communication, the transmit DAC circuit 110 receives the transmit digital data 90 from its host device 104 in one of the formats of FIG. 9, or another format, and at a data rate of the host device (e.g., 100 Mbps, 1 Gbps, etc.) If necessary, the transmit DAC circuit 110 converts the format of the transmit digital data 90 in accordance with one or more transmit parameters 132. In addition, the transmit DAC circuit 110 synchronizes the transmit digital data with a bus data rate (e.g., the data rate at which data is transmitted via a line of the bus 80) to produce a digital input of n-bits per interval of the bus data rate, where "n" is an integer greater than or equal to one.

The transmit DAC circuit 110 converts the digital input into analog outbound data 134 via a range limited digital to analog converter (DAC) and a DC reference source. The drive sense circuit 106 converts the analog outbound data 134 into the analog transmit signal 96 and drives it on to a line of the bus 80.

The drive sense circuit 106 receives the analog receive signal 98 from the bus 80 and converts it into analog inbound data 124. The receive ADC circuit 108 converts the analog inbound data 124 into digital inbound data. The receive ADC circuit 108 filters the digital inbound data in accordance with one or more receive parameters 126 to produce the filtered data. The receive ADC circuit 108 formats and packetizes the filtered data in accordance with one or more receive parameters 126 to produce the received digital data 88. The receive ADC circuit 108 provides the received digital data 88 to the host device 104.

Figure 12:
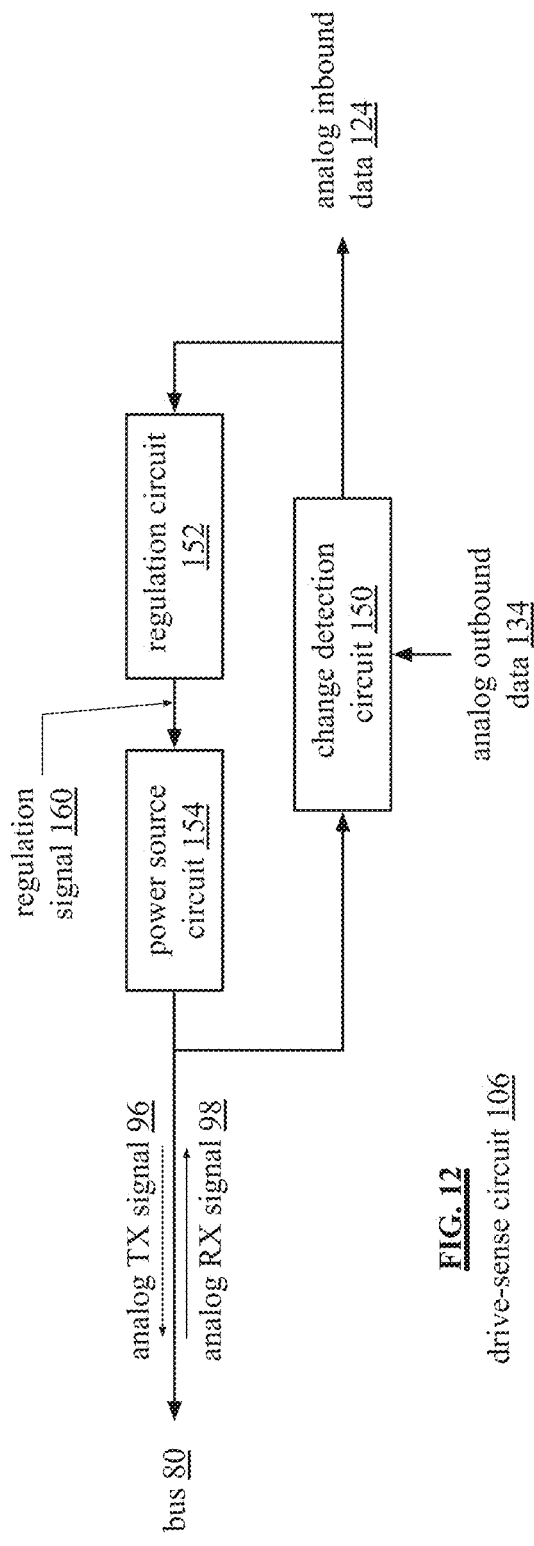
FIG. 12 is a schematic block diagram of an embodiment of a drive sense circuit of a Low Voltage Drive Circuit (LVDC) coupled to a host device in accordance with the present invention.

FIG. 12 is a schematic block diagram of an embodiment of a drive sense circuit 106 of a Low Voltage Drive Circuit (LVDC) 26 coupled to one or more lines of a bus 80. The line(s) of the bus are coupled to one or more other LVDCs. The drive sense circuit 106 includes a change detection circuit 150, a regulation circuit 152, and a power source circuit 154.

The change detection circuit 150, the regulation circuit 152, and the power source circuit 154 operate in concert to keep the inputs of the change detection circuit 150 to substantially match (e.g., voltage to substantially match, current to substantially match, impedance to substantially match). The inputs to the change detection circuit 150 include the analog outbound data 134 and the signals on the line(s) of the bus 80 (e.g., the analog RX signal 98 and the analog TX signal 96).

When there is no analog RX signal, the only signal on the bus is the analog transmit signal 96. The analog transmit signal is created by adjusting the operation of the change detection circuit 150, the regulation circuit 152, and the power source circuit 154 to match the analog outbound data 134. Since the analog transmit signal 96 tracks the analog outbound data 134 within the drive sense circuit 106, when there is no analog RX signal 158, the analog inbound data 124 is a DC value.

When an analog RX signal 98 is being received, the change detection circuit 150, the regulation circuit 152, and the power source circuit 154 continue to operate in concert to keep the inputs of the change detection circuit 150 to substantially match. With the presence of the analog RX signal 98, the output of the change detection circuit 150 will vary based on the analog RX signal 98, which produces the analog inbound data 124. The regulation circuit 152 converts the analog inbound data 124 into a regulation signal 160. The power source circuit 154 adjusts the generation of its output (e.g., a regulated voltage or a regulated current) based on the regulation signal 160 to keep the inputs of the change detection circuit 150 substantially matching.

Figure 13:
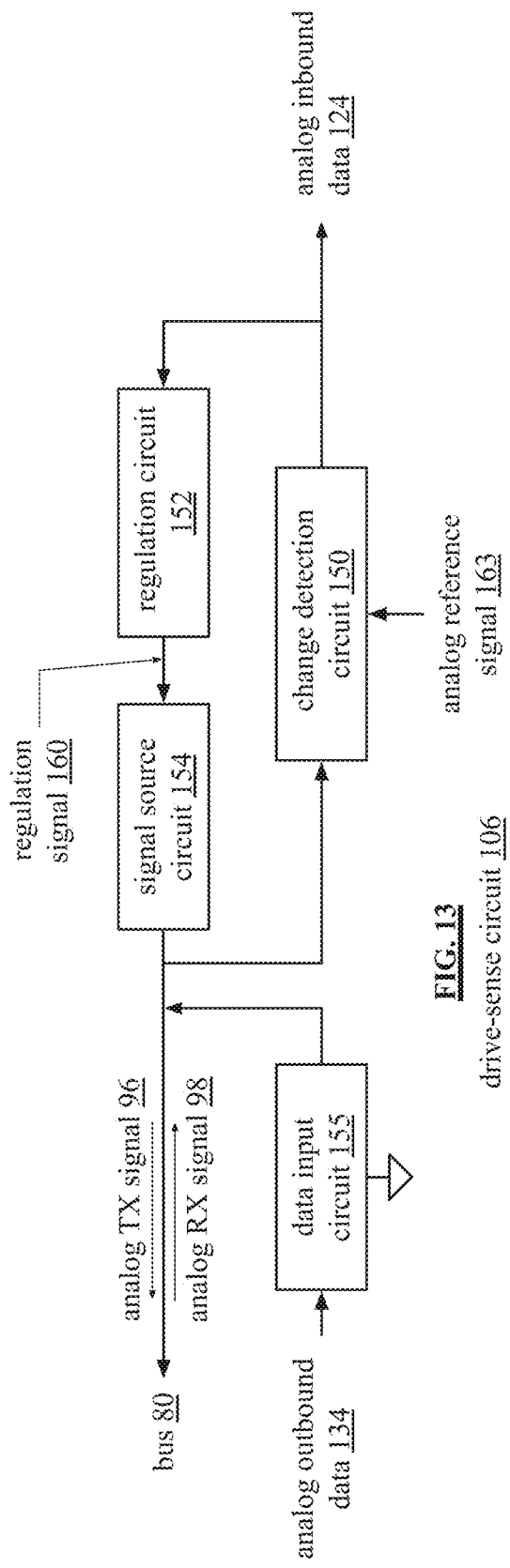
FIG. 13 is a schematic block diagram of another embodiment of a drive sense circuit of a Low Voltage Drive Circuit (LVDC) coupled to a host device in accordance with the present invention.

FIG. 13 is a schematic block diagram of another embodiment of a drive sense circuit 106 of an LVDC 26 coupled to one or more lines of a bus 80. The drive sense circuit 106 includes the change detection circuit 150, the regulation circuit 152, the power source circuit 154, and a data input circuit 155. The change detection circuit 150, the regulation circuit 152, and the power source circuit 154 function as discussed with reference to FIG. 14 to keep the inputs of the change detection circuit 150 substantially matching. In this embodiment, however, the inputs to the change detection circuit 150 are the signals on the bus (e.g., the analog transmit signal 96 and the analog receive signal 98) and an analog reference signal 163 (e.g., a DC voltage reference signal or DC current reference signal). The analog outbound data 134 is inputted to the data input circuit 155.

The data input circuit 155 creates the analog transmit signals 96 from the analog outbound data 134 and drives it on to the bus 80. In an example, the data input circuit 155 changes the loading on the bus in accordance with the analog inbound data 134 to produce the analog transmit signal 96.

Since the analog transmit signal 156 is being created outside of the feedback loop of the change detection circuit 150, the regulation circuit 152, and the power source circuit 154, the analog inbound data 124 will include a component corresponding to the analog receive signal 98 and another component corresponding to the analog transmit signal 96.

Figure 14:
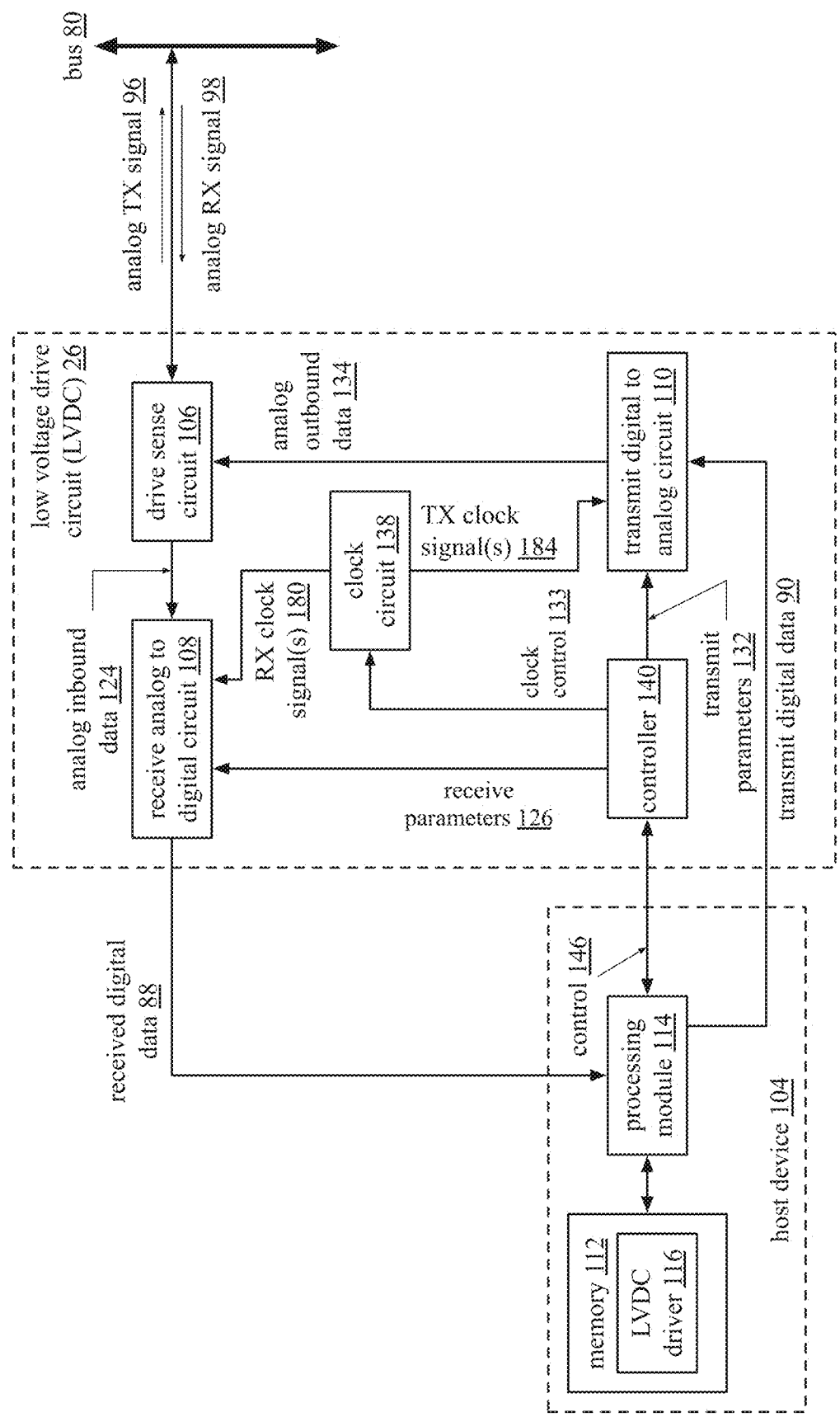
FIG. 14 is a schematic block diagram of another embodiment of a Low Voltage Drive Circuit (LVDC) coupled to a host device in accordance with the present invention.

FIG. 14 is a schematic block diagram of another embodiment of a Low Voltage Drive Circuit (LVDC) 26 coupled to a host device 104 and to one or more lines of a bus 80. The host device 104 includes a processing module 114 and memory 112 (e.g., volatile memory and/or non-volatile memory). The memory 112 stores at least part of an LVDC driver 116 application. The LVDC 26 includes a drive sense circuit 106, a receive analog to digital converter (ADC) circuit 108, a transmit digital to analog converter (DAC) circuit 110, a clock circuit 138, and a controller 140. The drive sense circuit 106, the receive ADC circuit 108, and the transmit DAC circuit 110 function as previously discussed with reference to FIG. 11.

In this embodiment, the processing module 114 of the host device 104 accesses the LVDC driver 116 to determine control information 146 to set up the LVDC 26 for operation. The processing module provides the control information 146 to the controller 140, which generates the receive parameters 126, the transmit parameters 132, and clock control signals 133 from the control information 146. In addition, the controller 140 determines one or more communication scheme parameters and/or one or more data conveyance scheme parameters based on the control information 146.

In an embodiment, the controller 140 is a processing module with associated memory. The memory (e.g., volatile and/or non-volatile) stores a plurality of look up tables: a first for the communication parameters; a second for the data conveyance scheme parameters; a third for the transmit parameters 132; a fourth for the receive parameters 126; and a fifth for clock control parameters 133 (e.g., clock rate settings, duty cycle settings, etc.).

The clock circuit 138 is operable to create one or more transmit clock signals 184 and to create one or more receive clock signals 180 based on the clock control parameters, or information, 133. For example, the clock circuit 138 generates a first receive clock signal for outputting the receive digital data 88 to the host device 104 and a second receive clock for converting the analog inbound data 124 into digital inbound data. As another example, the clock circuit 138 generates a first transmit clock for receiving the transmit digital data 90 from the host device and a second transmit clock for converting the transmit digital data 90 into the analog outbound data 134.

Figure 15:
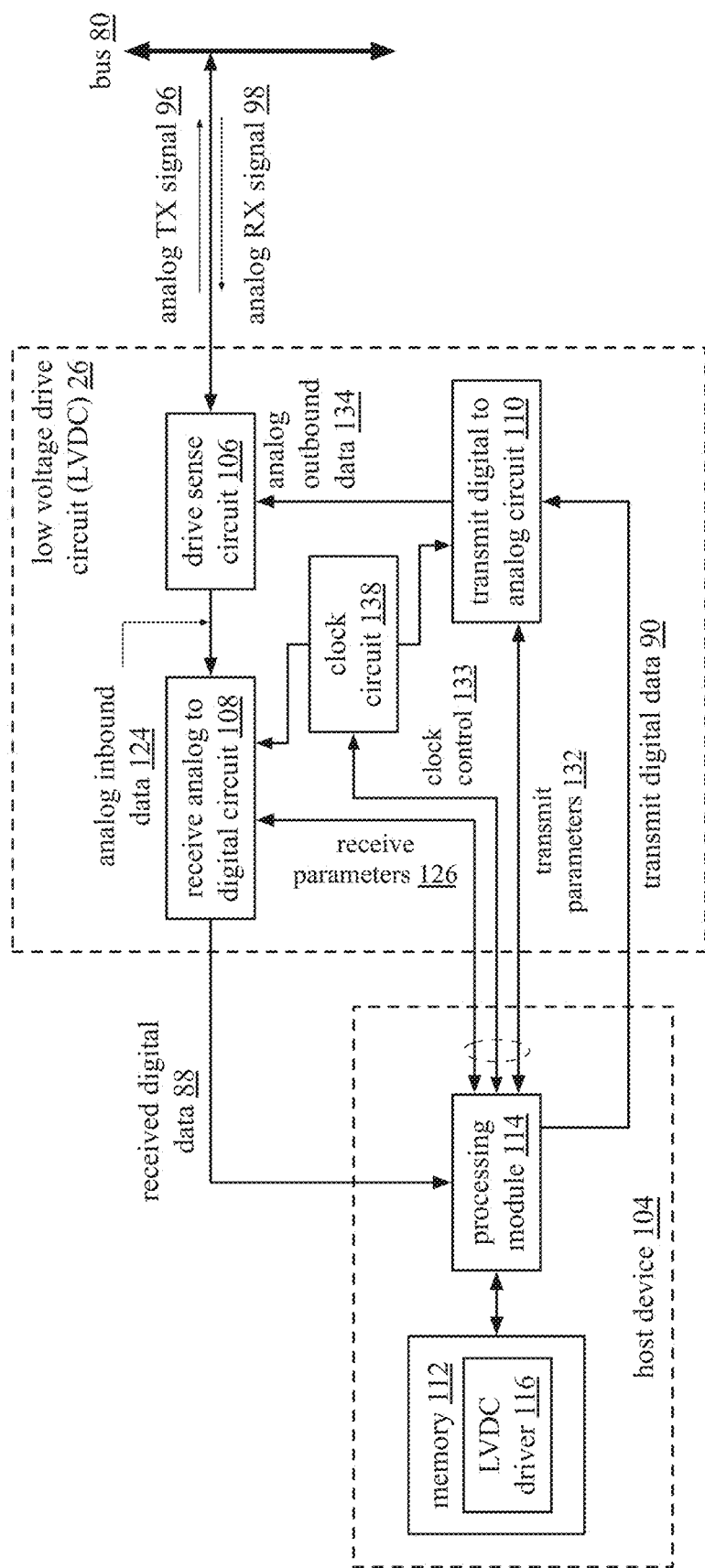
FIG. 15 is a schematic block diagram of another embodiment of a Low Voltage Drive Circuit (LVDC) coupled to a host device in accordance with the present invention.

FIG. 15 is a schematic block diagram of another embodiment of a Low Voltage Drive Circuit (LVDC) 26 coupled to a host device 104 and to one or more lines of a bus 80. This embodiment of the LVDC 26 is similar to that of FIG. 14 with the exception that this embodiment does not include the controller 140. As such, the processing module 114 generates the receive parameters 126, the clock control information 133, and the transmit parameters 132. The processing module 114 also generates the one or more communication scheme parameters and the one or more data conveyance scheme parameters.

Figure 16:
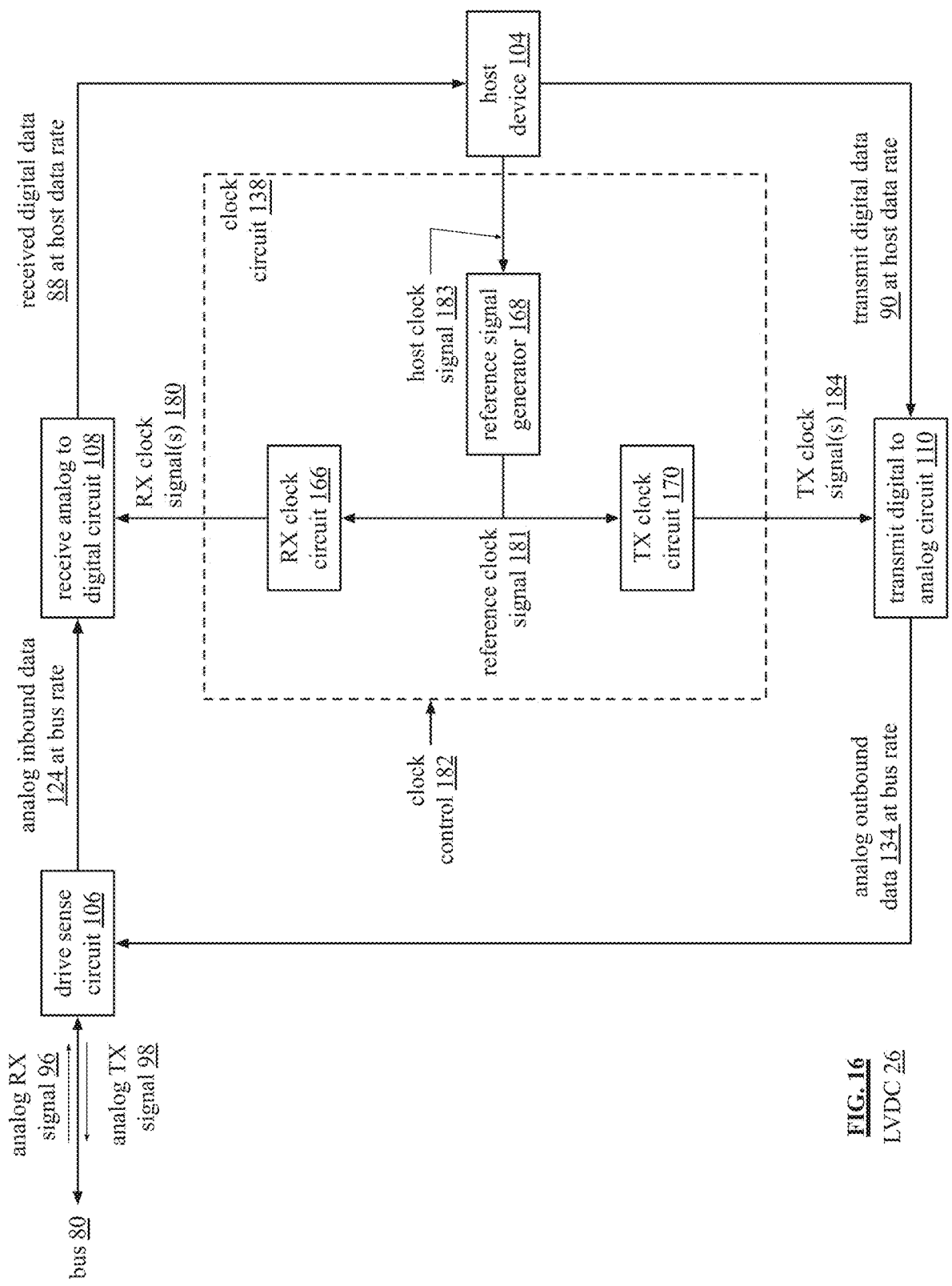
FIG. 16 is a schematic block diagram of another embodiment of a Low Voltage Drive Circuit (LVDC) in accordance with the present invention.

FIG. 16 is a schematic block diagram of another embodiment of a Low Voltage Drive Circuit (LVDC) 26 coupled to a host device 104 and to one or more lines of a bus 80. The LVDC 26 includes a drive sense circuit 106, a receive analog to digital circuit 108, a transmit digital to analog circuit 110, and a clock circuit 138. The clock circuit 138 includes a reference signal generator 168, a receive (RX) clock circuit 166, and a transmit (TX) clock circuit 170. The reference signal generator 168 may be implemented in a variety of ways to produce a reference clock signal 181. For example, the reference signal generator 168 is a phase locked loop (PLL) with an input clock from the host device or from a crystal oscillator. As another example, the reference signal generator 168 is a digital frequency synthesizer. As yet another example, the reference signal generator 168 is an oscillator.

The transmit clock circuit 170 includes one or more of: one or more frequency dividers, one or more frequency multipliers, one or more phase shift circuits, and one or more PLLs to generate transmit clock signals 184 from the reference clock signal 181. For example, the host clock signal 183 is a 2.000 GHz clock. The reference signal generator 168 creates a reference clock signal 181 of 2.100 GHz from the host clock signal. The transmit clock circuit 170 generates a 2.000 GHz clock used by the transmit digital to analog circuit 110 to receive the transmit digital data 90 from the host device 104 in sync with the host clock signal 183. The transmit clock circuit 170 also generates a 2.010 GHz clock signal for a transmit channel having a 2.010 GHz frequency. The transmit digital to analog circuit 110 uses the 2.010 GHz clock signal to generate the analog outbound data 134 to be in sync with a bus clock.

The receive clock circuit 166 also includes one or more of: one or more frequency dividers, one or more frequency multipliers, one or more phase shift circuits, and one or more PLLs to generate receive clock signals 180 from the reference clock signal 181. For example, the host clock signal 183 is a 2.000 GHz clock. The reference signal generator 168 creates a reference clock signal 181 of 2.100 GHz from the host clock signal. The receive clock circuit 166 generates a 2.020 GHz clock signal for a receive channel having a 2.020 GHz frequency. The receive analog to digital circuit 108 uses the 2.020 GHz clock signal to receive the analog inbound data 124 in sync with the bus clock. The receive clock circuit 166 also generates a 2.000 GHz clock used by the receive analog to digital circuit 108 to provide the received digital data 88 to the host device 104 in sync with the host clock signal 183.

Figure 17:
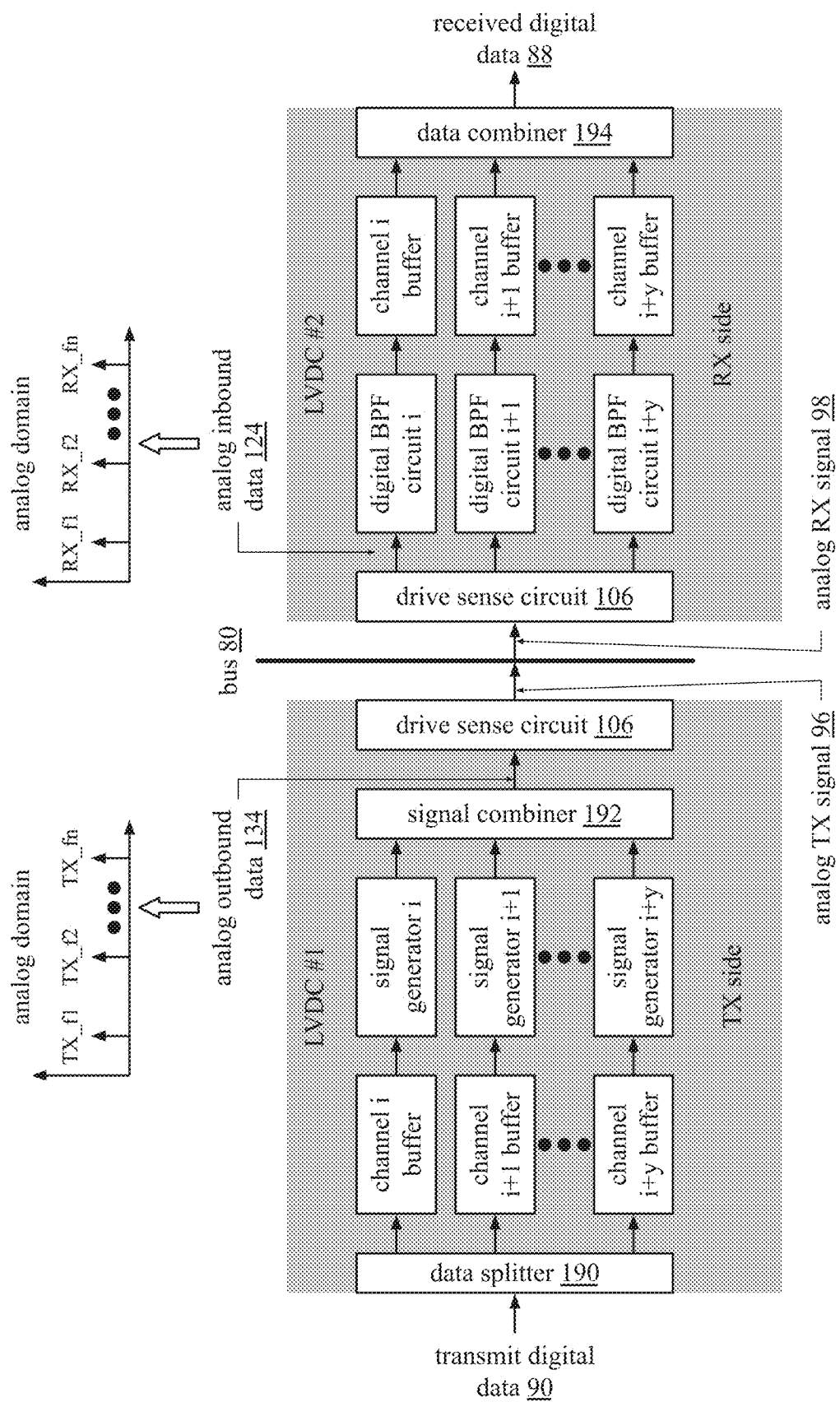
FIG. 17 is a schematic block diagram of an embodiment of a transmit side of one LVDC and a receive side of another Low Voltage Drive Circuits (LVDC) in accordance with the present invention.

FIG. 17 is a schematic block diagram of an embodiment of a transmit side of a first Low Voltage Drive Circuit (LVDC) coupled to a receive side of a second LVDC via one or more lines of a bus 80. The transmit side of the LVDC #1 includes a data splitter 190, a plurality of channel buffers (i through i+y), a plurality of signal generators (i through i+y), a signal combiner 192, and a drive sense circuit 106. With reference to FIGS. 11, and 14-16, the data splitter 190, the channel buffers (i through i+y), the signal generators (i through i+y), and the signal combiner 192 are included in the transmit digital to analog circuit 110.

The receive side of LVDC #2 includes a drive sense circuit 106, a plurality of digital bandpass filter circuits (BPF i through i+y), a plurality of channel buffers (i through i+y), and a data combiner 194. With reference to FIGS. 11, and 14-16, the digital bandpass filter circuits (BPF i through I+y), the channel buffers (i through i+y), and the data combiner 194 are included in the receive analog to digital circuit 108.

In an example, the data splitter 190 receives the transmit digital data 90 and divides it into a plurality of data streams. A corresponding channel buffer stores a data stream. For instance, channel buffer i stores data stream i; channel buffer i+1 stores data stream i+1, and so on. The data streams are written into the channel buffers in accordance with the host data rate. The data, however, is read out of the channel buffers in accordance with transmit clock rates for each of the signal generators. The transmit clocks corresponds to the frequency of the channel being used by a signal generator.

Each enabled signal generator uses a different channel to convert bits of its respective data stream into respective portions of the analog outbound data 134. For example, signal generator i uses channel 1, which has a first frequency (f1), signal generator i+1 uses channel 2, which has a second frequency (f2), and so on. Note that, one or more of the signal generators is activated to convert the transmit digital data 90 into the analog outbound data 134.

As a specific example, signal generator i converts n-bits of its data stream at a time into an analog signal component of the analog outbound data 134, where n is an integer greater than or equal to one. For an n-bit sample of its data stream, the signal generator encodes the n-bit sample into a sinusoidal signal having a frequency at f1 using amplitude shift keying (ASK) signal and/or a phase shift keying (PSK) signal. Signal generator i+1 functions similarly by encoding an n-bit sample of its data stream into a sinusoidal signal having a frequency at f2 using ASK and/or PSK.

The drive sense circuit 106 of the first LVDC converts the analog outbound data 134 into an analog transmit signal 96, which it transmits on to a line of the bus 80. The drive sense circuit 106 of the second LVDC receives it as an analog receive signal 98 and converts it into analog inbound data 124. As such, without conversion, transmission, or reception errors, the analog inbound data 124 is substantially identical to the analog outbound data 134.

Each digital bandpass filter (BPF) circuit includes an analog to digital converter and a digital bandpass filter. Each active digital BPF circuit receives the analog inbound data 124. In addition, each active digital BPF circuit is tuned for a different channel. For example, digital BPF circuit i is tune for frequency 1, digital BPF circuit i+1 is tuned for frequency 2, and so on. As such, digital BPF circuit i converts the analog inbound data into digital inbound data, filters it, and outputs the n-bit digital values corresponding to the data stream processed by signal generator i. Similarly, digital BPF circuit i+1 converts the analog inbound data into digital inbound data, filters it, and outputs the n-bit digital values corresponding to the data stream processed by signal generator i+1; and so on.

The channel buffers of the receive side of LVDC store the n-bit digital values outputted by their respective digital BPF circuits. The data combiner 194 retrieves data from the channel buffers and periodically outputs the received digital data 88. For example, a block of data is inputted into the data splitter 190 in accordance with a data rate of the host device (host 1) coupled to the first LVDC. As a specific simplified example, assume the data block includes 24-bits and is clocked into the data splitter serially over 24 intervals of a data clock of host 1. Further assume that the 24-bits are divided into three data streams, each 8-bits. As such, three paths will be activated between the data splitter 190 of LVDC #1 and the data combiner 194 of LVDC #2.

Each activated path operates independent of the other paths and at different rates to process their respective data streams of the data block. For example, the first path (e.g., signal generator i through digital BPF circuit i) operates in accordance with frequency f1, which is at slightly higher frequency than that of the data rate of host 1; the second path (e.g., signal generator i+1 through digital BPF circuit i+1) operates in accordance with frequency f2, which is at slightly higher frequency than that of frequency f1; and the third path (e.g., signal generator i+2 through digital BPF circuit i+2) operates in accordance with frequency f3, which is at slightly higher frequency than that of frequency f2.

Continuing with the simplified example, further assume that the data clock of host 1 is 1.000 GHz for a 125 Mega Byte per second (MBps) data rate, which corresponds to a 1 Gbps data rate; data is provided to the data splitter a byte at a time; frequency f1 is at 1.010 GHz, frequency f2 is at 1.020 GHz, and frequency f2 is at 1.030 GHz. There are a variety of ways the data splitter 190 can divide the data and put it into the channel buffers. For example, the data splitter 190 uses a bit-by-bit round robin distribution.

As data is put into the channel buffers on the transmit side, the signal generators begin to process them. In this example, a bit at a time. Since signal generator i+2 is operating at a rate that is faster than the other two signal generates, it will finish processing its 8-bits slightly before the others. As such, digital BPF circuit i+2 will finish recovering the 8-bits of data slightly before the other digital BPF circuits. The timing difference is compensated for by the buffers on each end such that, as 24-bits goes into the transmitting LVDC at the rate of the first host device, the same 24-bits will come out of the receiving LVDC at the rate of the host device of the second LVDC.

Figure 18:
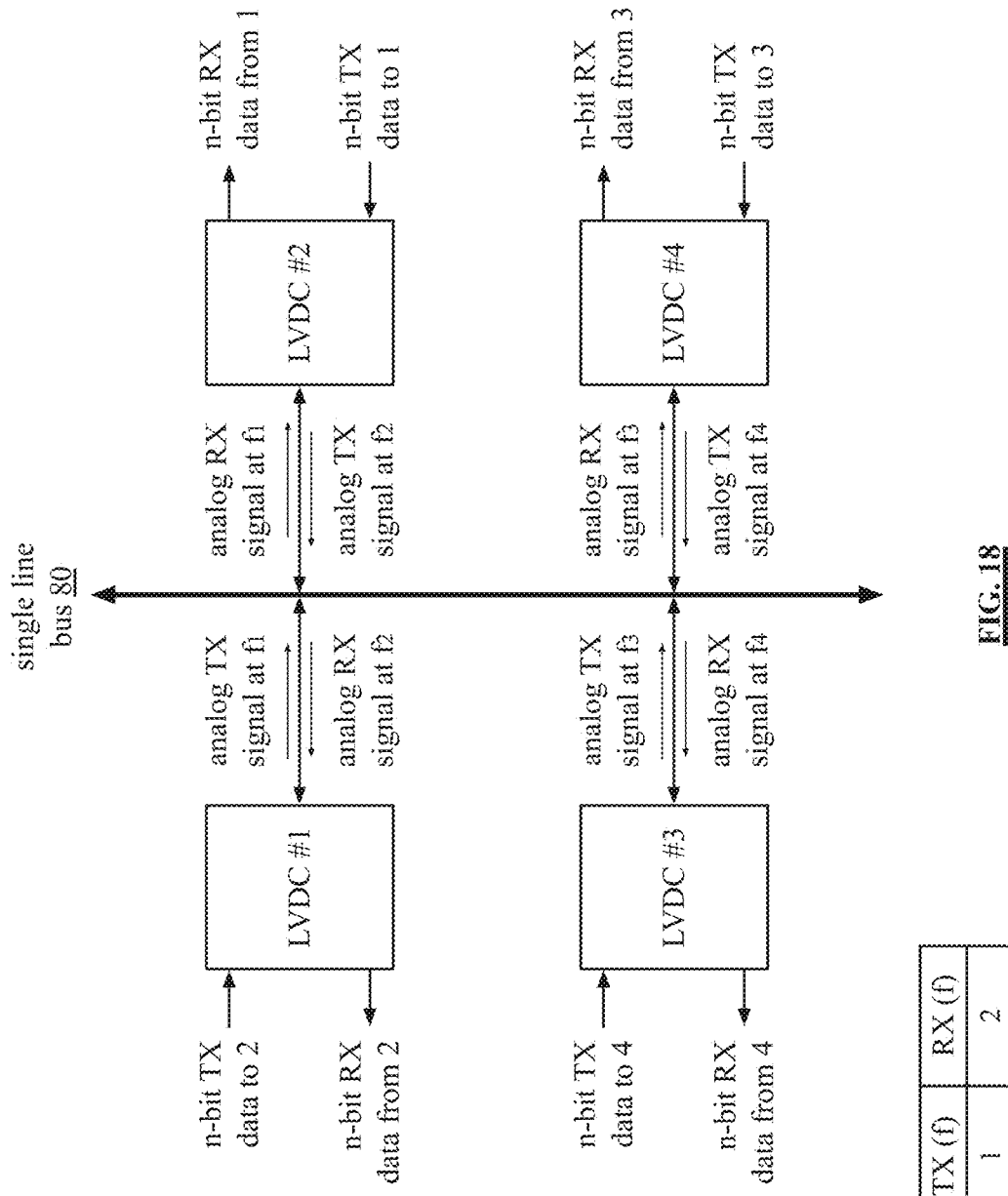
FIG. 18 is a schematic block diagram of an embodiment of one-to-one communications between Low Voltage Drive Circuits (LVDCs) on a single line of a bus in accordance with the present invention.

FIG. 18 is a schematic block diagram of an embodiment of one-to-one communications between Low Voltage Drive Circuits (LVDCs) on a single line of a bus 80. In this example, LVDC 1 and LVDC 2 are engaged in a one-to-one communication and LVDC 3 and LVDC 4 are engaged in a one-to-one communication on a common single line of the bus 80. Each of the LVDCs 1-4 are associated with its own host device, which was previously discussed with reference to one or more of FIGS. 2-8, 11, 14, and 15.

To support the one-to-one communication between LVDC 1 and 2, LVDC 1 is allocation channel (f1) for its transmissions to LVDC 2 and LVCD 2 is allocated channel (f2) for its transmissions to LVDC 1. Similarly, to support the one-to-one communication between LVDC 3 and 4, LVDC 3 is allocation channel (f3) for its transmissions to LVDC 4 and LVCD 4 is allocated channel (f4) for its transmissions to LVDC 3.

As an example of operation, the transmit digital to analog circuit 110 of LVDC 1 converts n-bit transmit (TX) data per data clock cycle of a host device into analog outbound data and the drive sense circuit of LVDC 1 converts the analog outbound data into an analog TX signal on channel (f1). For example, the n-bit TX data is 1-bit data at a data clock rate of 1 GHz, thus the data rate is 1 Giga-bit-per-second (Gbps).

LVDC 1 encodes the 1-bit data at 1 Gbps into a sinusoidal signal (or other type of oscillating signal waveform such as a square wave, sawtooth, triangular, etc.) at frequency f1 to produce the analog TX signal on channel f1. The 1-bit data may be encoded into the sinusoidal signal in several ways. For example, the 1-bit data is directly encoded into one or more cycles of the sinusoidal signal using amplitude shift keying (ASK) and/or phase shift keying (PSK). As another example, the 1-bit data is converted into an analog signal that is up-converted by a local oscillation having a frequency at f1 to produce the analog TX signal.

The drive sense circuit 106 of LVDC 1 transmits the analog TX signal at f1 on the single line of the bus 80. Each of the other LVDCs 2-4 receive the analog TX signal at f1 but only LVDC 2 is tuned to process the analog TX signal at f1 as an analog RX signal at f1. In particular, the receive analog to digital circuit 108 of LVDC 2 is tuned to process received signals on channel f1, which corresponds to the analog TX signal at f1. The receive analog to digital circuit 108 of LVDC 3 is tuned to process signals on channel f4 and the receive analog to digital circuit 108 of LVDC 4 is tuned to process signals on channel f3. The receive analog to digital circuit 108 of LVDC 2 converts the analog RX signal at f1 into an n-bit of data per data clock interval of the host device associated with LVDC 2.

Similarly, the transmit digital to analog circuit 110 of LVDC 2 converts its n-bit transmit (TX) data input (e.g., n-bits of data per data clock cycle of its associated host device) into analog outbound data. The drive sense circuit of LVDC 2 converts the analog outbound data into an analog TX signal on channel (f2) and transmits the resulting signal on to the line of the bus 80. Each of the other LVDCs 1, 3, and 4 receive the analog TX signal at f2, but only LVCD 1 is tuned to process the analog TX signal at f2 as an analog RX signal at f2 to produce n-bit RX of data per data clock cycle of its associated host device.

The one-to-one communication between LVCD 3 and 4 operates similarly to the one-to-one communication between LVDC 1 and 2. The allocation of channel 1 to LVDC 1, channel 2 to LVDC 2, channel 3 to LVDC 3, and channel 4 to LVDC 4 may be done in several ways. For example, a channel is allocated to an LVDC on a permanent basis (e.g., a channel is allocated to the LVDC regardless of whether its host device is enabled or not). As another example, a channel is allocated to an LVDC when its host device has data to transmit. As yet another example, a channel is allocated to an LVDC while its host device is enabled.

Figure 19:
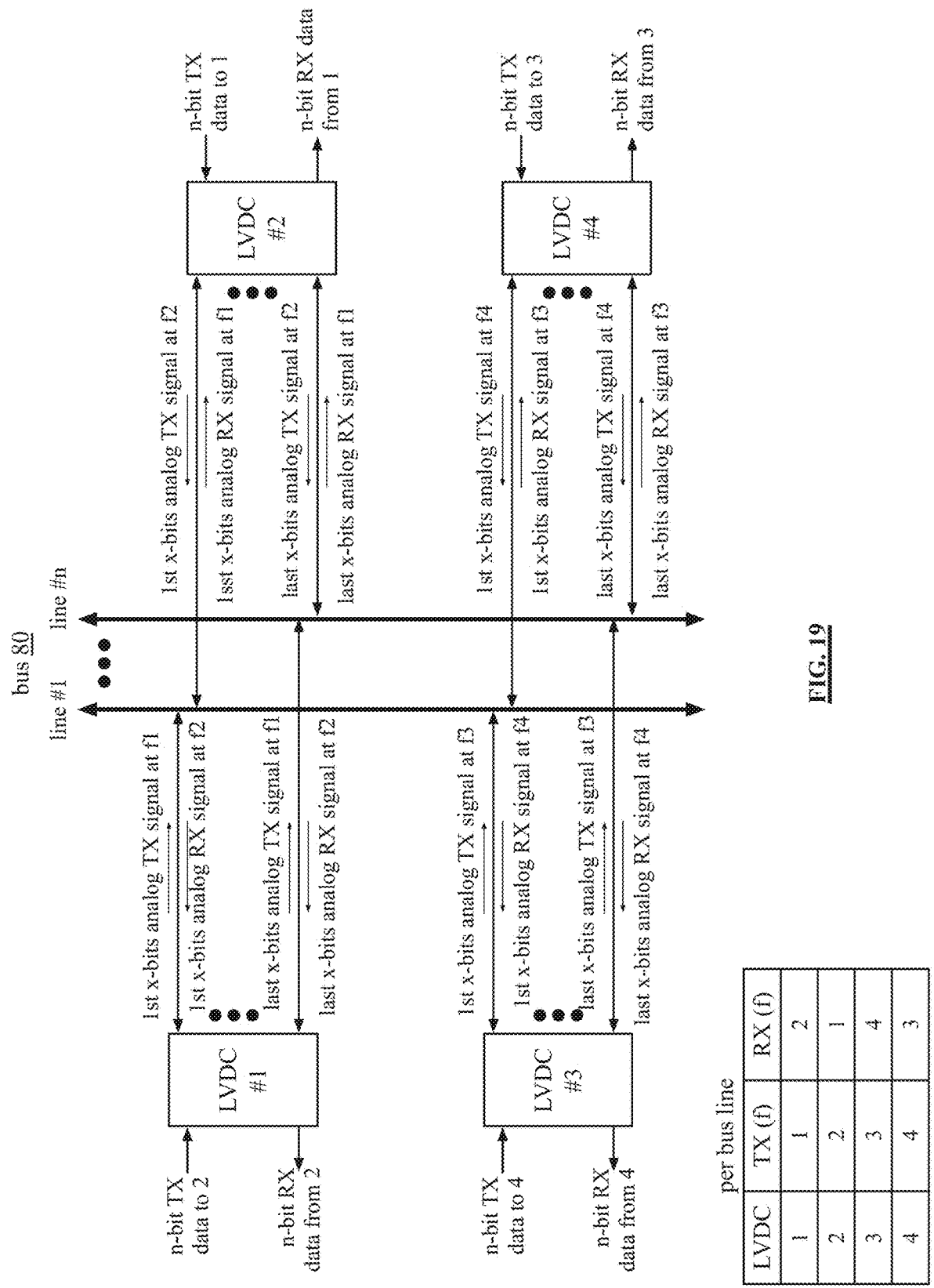
FIG. 19 is a schematic block diagram of an embodiment of one-to-one communications between Low Voltage Drive Circuits (LVDCs) on multiple lines of a bus in accordance with the present invention.

FIG. 19 is a schematic block diagram of an embodiment of one-to-one communications between Low Voltage Drive Circuits (LVDCs) on multiple lines of a bus 80. In this example, the bus 80 includes "n" lines, wherein "n" is an integer greater than or equal to 2. As in the example of FIG. 18, LVDCs 1 and 2 are engaged in a one-to-one communication and LVDCs 3 and 4 are engaged in a one-to-one communication. In this example, however, the LVCDs are transmitting and receiving data via multiple lines of the bus, which increases the data rate conveyance between the LVDCs.

As an example of operation, LVCD 1 has n-bits of data per data clock cycle of its associated host device to transmit to LVDC 2. LVDC 1 divides the n-bits of data into a number of streams of data, where the number corresponds to the number of lines of the bus being used for transmitting the data. For example, assume 4 lines of the bus are being used, where the bus includes 4 or more lines. As such, the n-bits of data per data clock cycle is divided into 4 x-bits of data per clock cycle, where x is an integer greater than or equal to 1. Thus, if x=2, then n=8 such that 8-bits per data clock cycle is being transmitted.

In this specific example, LVDC 1 includes four digital to analog transmit (DAC TX) circuits and four drive sense circuits. A first DAC TX circuit processing the first x-bits of data, a second first DAC TX circuit processing the second x-bits of data, a third DAC TX circuit processing the third x-bits of data, and a fourth DAC TX circuit processing the fourth x-bits of data. Each DAC TX circuit of LVDC 1 produces analog outbound data. Each of the corresponding drive sense circuits of LVDC 1 converts the respective analog outbound data into analog TX signal at f1, which is drives on to a respective one of the lines of the bus 80. In particular, the first drive sense circuit drives the first analog TX signal at f1 on to a first line of the bus, the second drive sense circuit drives the second analog TX signal at f1 on to a second line of the bus, the third drive sense circuit drives the third analog TX signal at f1 on to a third line of the bus, and the fourth drive sense circuit drives the fourth analog TX signal at f1 on to a fourth line of the bus.

Continuing with this example, LVDC 2 includes four drive sense circuits and four analog to digital receive (ADC RX) circuits. The first drive sense circuit receives, as a first analog RX signal at f1, the first analog TX signal at f1 from a first line of the bus, the second drive sense circuit receives, as a second analog RX signal at f1, the second analog TX signal at f1 from a second line of the bus, and so on. Each of the drive sense circuits also receives the corresponding analog TX signal at f3 from LVDC 3 and the corresponding analog TX signal at f4 from LVDC 4. Accordingly, each drive sense circuit converts the analog RX signals at f1, f3, and f4 into inbound analog data, which has an inbound analog data component from LVDC 1, an inbound analog data component from LVDC 3, and an inbound analog data component from LVDC 4.

The corresponding ADC RX circuits of LVDC 2 are tuned to process the inbound analog data component from LVDC 1 and ignore the inbound analog data components from LVDC 3 and 4. As such, each of the corresponding ADC RX circuits of LVDC 2 converts its respective inbound analog data component from LVDC 1 into x-bits of data per data clock cycle of the host device associated with LVDC 2. In particular, the first ADC RX circuit produces the first x-bits of data, the second ADC RX circuit produces the second x-bits of data, the third ADC RX circuit produces the third x-bits of data, and the fourth ADC RX circuit produces the fourth x-bits of data. The LVDC combines the four x-bits of data into the n-bits of data from the first LVDC; which is done per data clock cycle of the host device associated with the second LVDC.

LVDC 2 communicates its n-bits of data per data clock cycle to LVDC 1 in a similar manner. The one-to-one communication between LVDC 3 and LVDC 4 is performed in a similar manner as the one-to-one communication between LVDC 1 and LVDC 2, but using different channels.

Figures 20, 21:
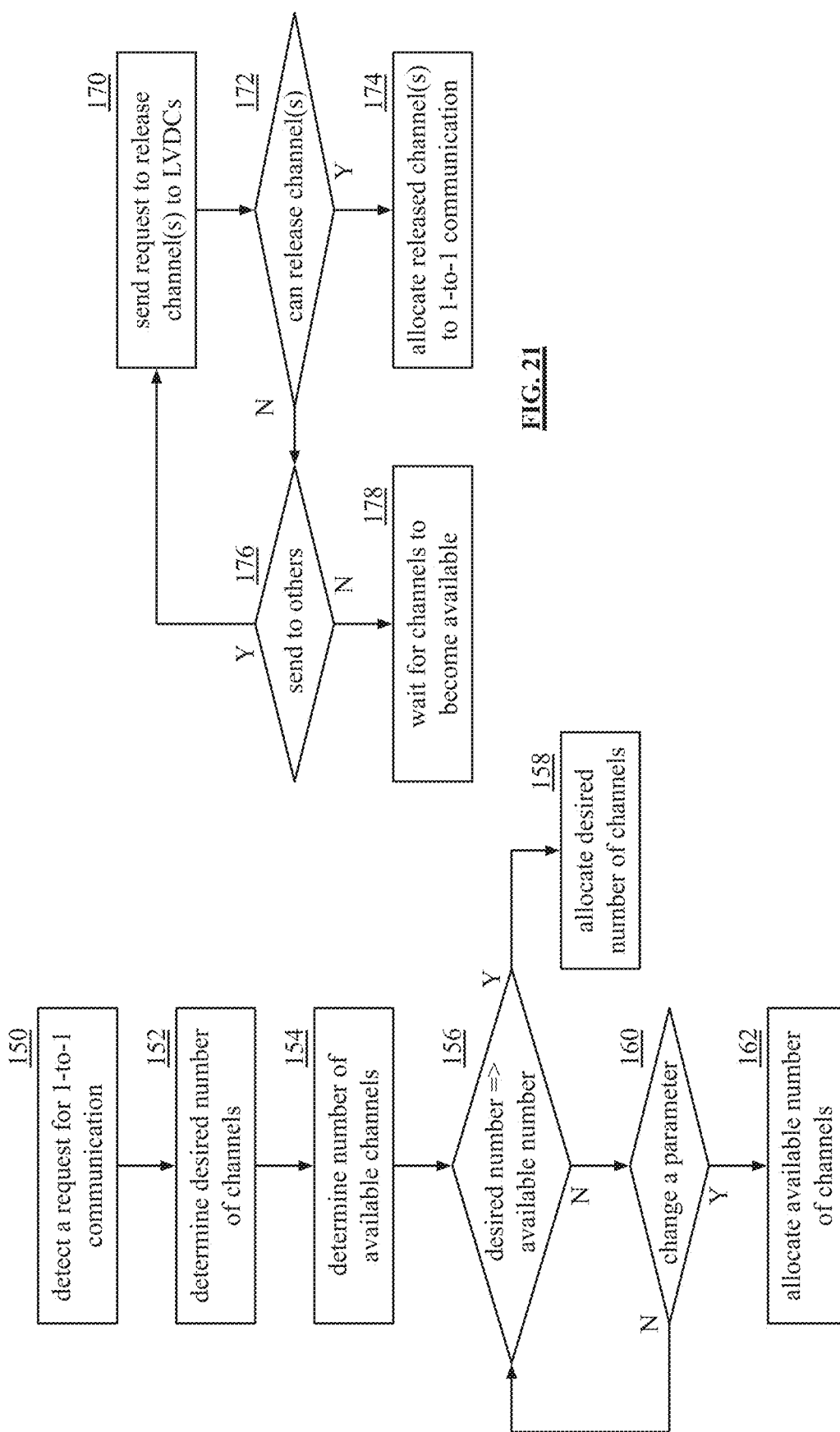
FIGS. 20 and 21 are a logic diagram of an example of a method for allocating channels for a one-to-one communication between Low Voltage Drive Circuits (LVDCs) in accordance with the present invention.

FIGS. 20 and 21 are a logic diagram of an example of a method for allocating channels for a one-to-one communication between Low Voltage Drive Circuits (LVDCs) executed by one or more processing entities, where a processing entity includes one or more of: the host device, a processing module of a host device, memory storing a LVDC driver (e.g., a set of operational instructions), a controller of an LVDC, and the LVDC. While executing the method, processing entity (or one or more of its components) operate in a dominant LVDC state, a passive LVDC state, or a peer LVDC state.

For example, in the dominant LVDC state, the processing entity controls the exchange of information with one or more other processing entities to setup communications and the other processing entities take on a passive LVDC state. As a specific example, the dominant processing entity sends queries, instructions, and/or commands to passive processing entities and the processing entities respond accordingly. The dominant processing entity processes the responses to setup a communication among the LVCDs associated with the processing entities, including channel allocation for the communication. The selection of a dominant processing entity may be done in a variety of ways. For example, the dominant processing entity is default selected based on the identity of the host device. As another example, the dominant processing entity is the one to first initiate a request for the communication. As yet another example, the dominant processing entity is selected at random among the processing entities associated with the communication.

As another example, when the processing entities are in a peer LVDC state, they share responsibilities for setting up a communication between their LVDCs. As such, one processing entity determines a desired number of channels, another determines a data conveyance scheme, and so on.

The method begins at step 150 of FIG. 21 where a processing entity affiliated with a first host device detects a request for a one-to-one communication with a second LVDC affiliated with a second host device. For example, a first host device determines that it desires to establish a communication with a second host device via the respective LVDCs. In this example, the first processing entity sends a communication request to the second processing entity via a control channel regarding the one-to-one communication. In response to the request, the second processing entity determines whether it, or one or more of its components, are able to engage in a communication (e.g., is turned on, is not locked in another communication, is not damaged, is not prohibited from engaging in a communication with components of the first processing entity, etc.). When the second processing entity determines that it can participate in the one-to-one communication with the first processing entity, it sends a favorable communication response to the first processing entity via the control channel.

The control channel is a dedicated channel of the frequency band that is shared by all LVDCs coupled to one or more lines of a bus. The control channel is used primarily to convey configuration data and communication support data and not for the data conveyance between host devices via their LVDCs. Accordingly, for this embodiment, the first and second LVDCs are coupled to a bus, wherein data is to be conveyed on the bus by varying loading on the bus at a frequency. For example, a first LVDC encodes data by varying a voltage, a current, and/or an impedance, at a particular frequency, on the bus (e.g., a line of the bus). A second LVDC detects the variances of the load on the bus at the particular frequency to recover the data.

The method continues at step 152 where the first and/or second processing entities determine a desired number of channels to support the one-to-one communication. For example, the processing entity(s) determines a data conveyance scheme and a communication scheme to support the communication. From the selected scheme options, the processing entity(s) determine a desired number of channels. The data conveyance scheme is regarding formatting of data for the communication. For instance, the data conveyance scheme includes one or more elements of:

a desired data rate for the communication (e.g., number of bits per second);
a data rate per line of the bus (e.g., number of bits per second per line);
desired number of lines of a bus to use for the communication;
desired number of channels per line;
data coding scheme per line (e.g., 1-bit encoded per data clock interval, multiple bit encoding per data clock interval, and/or a type of encoding (e.g., amplitude shift keying (ASK), phase shift keying (PSK), frequency shift keying (FSK), a combination thereof, etc.));
voltage and/or current level for data coding scheme per line (e.g., determine DC component value, peak-to-peak value(s) for oscillating component(s), etc.);
digital data format (e.g., conventional binary, return to zero, non-return to zero, Manchester, etc.);
packet formatting (e.g., header content (e.g., one or more of source identifier, destination identifier, training sequence, packet information, start of packet indicator, etc.), data fields, size of data fields, overall packet size, integrity check, etc.); and
transmit power level per line.

The communication scheme is regarding the manner in which communication is executed. For instance, the communication scheme includes one or more elements of:
independent data communication (e.g., push the data to other LVDC without prompting from the other LVDC);
dependent data communication (e.g., push or pull data to or from other LVDC with prompting and/or coordinate with other LVDC);
half duplex communication;
full duplex communication;
permanent communication (e.g., dedicated channel allocation per line(s) between LVDCs whether LVDCs and/or their host devices are active or not);
semi-permanent communication (e.g., dedicated channel allocation per line(s) between LVDCs when LVDCs and their host devices are active); and
as needed communication (e.g., channels allocated to communication up request for a communication and then unallocated).

The method continues at step 154 where the processing entity(s) determine whether the desired number of channels is available for the one-to-one communication. For example, a processing entity accesses a channel allocation table to determine available channels per line on the bus. An example of a channel allocation table is further discussed with reference to FIGS. 22 and 23.

The method continues at step 156 where the processing entity(s) determines whether the desired number of channels is greater than or equal to the available number of channels. When it is, the method continues to step 158 where the processing entity(s) allocate the desired number of channels to the communication from the available channels. In addition, the processing entity(s) update the channel allocation table to indicate the allocation of the desired number of channels to the communication. For a full duplex communication, a first set of channels (e.g., one or more channels) are allocated to the first processing entity and a second set of channels (e.g., one or more channels) are allocated to the second processing entity.

When the desired number of channels is less than the available number of channels, the method continues at step 160 where the processing entity determines whether a parameter of the communication can be changed. The parameter is from a list of parameters that includes one or more elements of the data conveyance scheme and one or more elements of the communication scheme. In another embodiment, the list of parameters further includes one or more elements of receive parameters and/or one or more elements of transmit parameters.

The receive parameters include one or more elements of:
a receive clock rate (e.g., clock rate for digital filtering, receive data buffer read clock rate, received data buffer write clock rate, etc.);
digital filtering parameters (e.g., digital filtering clock rate, number of taps per digital filter, digital filter coefficients, etc.);
receive digital data format;
receive data packet format; and
bits per receive interval.

The transmit parameters include one or more elements of:
transmit clock rate (e.g., clock rate for transmit digital to analog circuit, clock rate for signal generators, etc.);
transmit digital data format;
transmit data packet format;
signal magnitude(s) (e.g., value for DC component of analog outbound data, peak to peak voltage of oscillating component of analog outbound data, current level, etc.); and
transmit power level.

As an example of adjusting a parameter, the processing entity lowers the data rate for the communication to reduce the desired number of channels per line. As another example, the processing entity changes the bit encoding from 1-bit per data clock interval to 2-bit per data clock interval. As another example, the processing entity creates a new channel within the frequency band or outside of the frequency band. When the parameter can be changed, the method continues at step 162 where the processing entity allocates the available channels (including any newly created channels) to the communication.

When a parameter cannot be changed, the method repeats at step 156. While in the loop of steps 156 and 160, the processing entity(s) can execute the method of FIG. 21 to potential obtain more available channels. The method begins at step 170 where the processing entity(s) sends a request to another processing entity associated with another LVDC to release a channel or channels. In an embodiment, the request is sent via a control channel, which is on at least one line of the bus to which the other LVDCs are coupled.

The method branches at step 171 based on whether the other processing entity can release a channel, or channels. If not, the method continues at step 176 where the processing entity determines whether to send the request to release a channel to yet another processing entity associated with yet another LVDC. If not, the method continues at step 178, where the processing entity waits for channels to become available (e.g., other communication ends, new channels are created, etc.). When a channel can be released, the method continues at step 174 where the other processing entity allocates the channel(s) to the one-to-one communication.

FIG. 22 is a logic diagram of an example of a method for utilizing a channel allocation table for communication between Low Voltage Drive Circuits (LVDCs). The method begins at step 180 where the processing entity(s) accesses a channel allocation table. The channel allocation table may be implemented in a variety of ways. For example, a channel allocation table includes the channel allocations for each line of a bus. As another example, a separate channel allocation table exists for each line on a bus as shown in FIG. 23. As a further example, each processing entity maintains its own copy of the channel allocation table(s). As a still further example, the processing entities share a global version of the channel allocation table(s).

The channel allocation list 185 of FIG. 23 includes a plurality of entries; one for each channel of a frequency band. Each entry includes a channel identifier field, a source ID field (identifier for transmitting LVDC), and one or more destination fields (identifier for one or more receiving LVDCs). Each entry identifies whether the corresponding channel is allocated or available (i.e., not allocated). When a channel is allocated, its entry further includes how the channel is allocated and to which LDVC, or its host device.

For example, the channel allocation table 185 includes "n" entries for "n" channels in a frequency band. For example, in a frequency band from 1 GHz to 2 GHz, channels are spaced every 100 MHz such that channel 1 is at 1.00 GHz, channel 2 is at 1.20 GHz, and so on to channel 11 at 2.00 GHz. As another example, in the frequency band from 1 GHz to 2 GHz, channels are spaced at 10 MHz such that channel 1 is at 1.000 GHz, channel 2 is at 1.010 GHz, channel 3 is at 1.020 GHz and so on to channel 101 at 2.000 GHz. Note that the spacing between channels effects the digital filtering performed in the receive analog to digital converter circuit. For instance, the wider the channel spacing, the less narrow the bandpass region needs to be, which reduces the number of taps of a digital filter.

In this example, channel 1 is allocated as the control channel for the LVDCs coupled to a bus. Channel 2 is allocated for LVDC "AA" transmitting to LVCDs "BB" and "CC". Channel 3 is allocated for LVDC "BB" transmitting to LVCDs "AA" and channel 4 is allocated for LVDC "CC" transmitting to LVCDs "AA". The remaining channels 5-n are not allocated and are thus available. The channel allocation table may further include a field for identifying a role of an LVDC in a communication. For example, an LVDC is a dominant LVDC, is a passive LVDC, or is a peer LVDC.

Returning to the method of FIG. 22, the method continues at step 182 where the processing entity(s) identify available channels per line from the channel allocation table 185. The method continues at step 184 where the processing entity(s) establishes a number of available channels and allocates available channels up to the desired number of channels for a communication. The processing entity(s) update the channel allocation table in accordance with the allocation of available channels to the communication.

The method continues at step 186 where the processing entity monitors the control channel for an allocation of a channel of the frequency band to another communication and/or for release of a channel from another communication. The method continues at step 188 where the processing entity(s) update the channel allocation list with the allocation of the channel to the other communication or a release of a channel by another communication.

FIG. 24 is a logic diagram of an example of a method for obtaining more channels to support a communication between Low Voltage Drive Circuits (LVDCs). The method begins at step 190 where the processing entity(s) of the one-to-one communication utilize the available number of channels, which is less than the desired number of channels for this example. The method continues at step 192 where the processing entity(s) monitor the control channel for release of another channel.

The method continues at step 194 where the processing entity(s) determines whether a channel has been released. If not, the method repeats at step 190. When a channel is released, the method continues at step 196 where the processing entity(s) allocated the other channel for the one-to-one communication. The method continues at step 198 where the processing entity(s) determine whether, with the newly allocated channel, the number of allocated channels now equals the desired number of channels. If not, the method repeats at step 190. When the communication is now supported by the desired number of channels, the method continues at step 200 where the processing entity(s) readjusts the parameter to an original setting.

Figure 25:
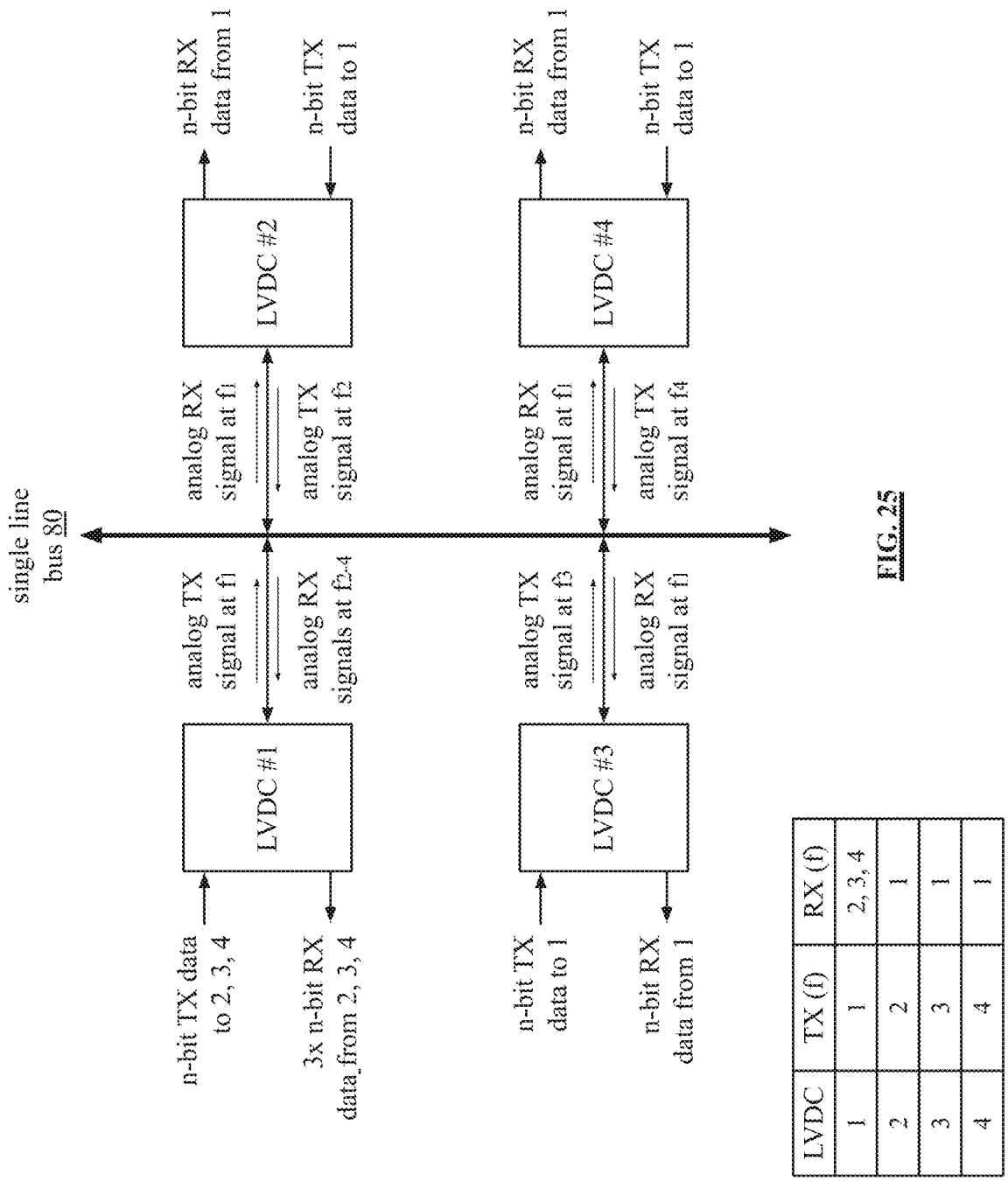
FIG. 25 is a schematic block diagram of an embodiment of one-to-many communications between Low Voltage Drive Circuits (LVDCs) on a single line of a bus in accordance with the present invention.

FIG. 25 is a schematic block diagram of an embodiment of one-to-many and many-to-one communication between Low Voltage Drive Circuits (LVDCs) on a single line of a bus 80. In this example, LVDC 1 is in communication with each of LVCDs 2, 3, and 4. For instance, LVDC 1 converts n-bits (1 or more) of transmit (TX) data per data clock interval into an analog TX signal at f1 and transmits it on channel f1 of a line the bus 80 to each of LVDCs 2, 3, and 4. The receive section of each of LVDCs 2, 3, and 4 are tuned to process the analog TX signal at f1 as an analog RX signal at f1 and recover the n-bits of TX data per data clock interval.

LVDC 2 converts n-bits of TX data destined for LVDC 1 into an analog TX signal f2 and transmits it on channel f2 of a line of the bus 80. Similarly, LVDC 3 converts n-bits of TX data destined for LVDC 1 into an analog TX signal f3 and transmits it on channel f3 of a line of the bus 80 and LVDC 4 converts n-bits of TX data destined for LVDC 1 into an analog TX signal f4 and transmits it on channel f4 of a line of the bus 80.

All of the LVCDs receive the analog TX signals f2-f4 as analog RX signals f2-f4 via the line of the bus 80, but only LVDC 1's receive section is tuned to process the analog RX signals f2-f4. For instance, LVDC 1 recovers the n-bits of TX data per data clock cycle of LVDC 2 from analog RX signal at f2; recovers the n-bits of TX data per data clock cycle of LVDC 3 from analog RX signal at f3; and recovers the n-bits of TX data per data clock cycle of LVDC 4 from analog RX signal at f4. In this embodiment, communication is generally set up as a broadcast from LVDC 1 to the other LVDCs and each of the other LVDCs individually communication with LVDC 1 (e.g., respond to the broadcast communication).

Figure 26:
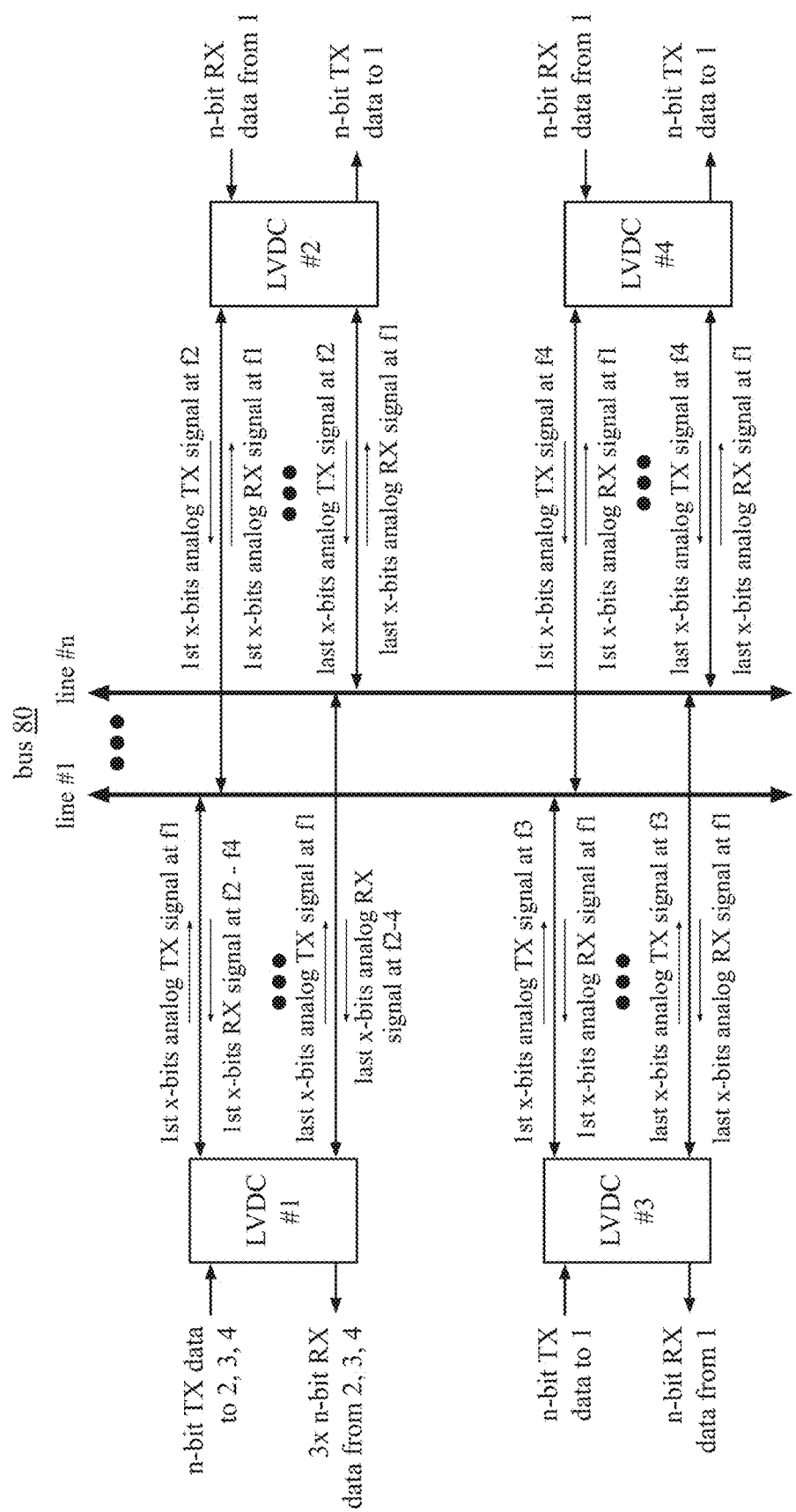
FIG. 26 is a schematic block diagram of an embodiment of a one-to-many communication between Low Voltage Drive Circuits (LVDCs) on multiple lines of a bus in accordance with the present invention.

FIG. 26 is a schematic block diagram of an embodiment of a one-to-many communication between Low Voltage Drive Circuits (LVDCs) on multiple lines of a bus 80. In this example, the bus 80 includes "n" lines, wherein "n" is an integer greater than or equal to 2. As in the example of FIG. 25, LVDC 1 is engaged in a one-to-many and many-to-one communication with LVDCs 2-4. In this example, however, the LVCDs are transmitting and receiving data via multiple lines of the bus, which increases the data rate conveyance between the LVDCs.

For example, LVDC 1 converts n-bits of TX data per data clock interval into an analog TX signal at f1. LVDC 1 transmits the analog TX signal at f1 to LVDCs 2-4 via the lines of the bus. LVDC 1 transmits a first x-bits of the n-bits of the TX data in a first analog TX signal transmitted on a first line of the bus, transmits a second x-bits of the n-bits of the TX data in a second analog TX signal transmitted on a second line of the bus, and so on until the last x-bits are transmitted on the last line of bus being used. As an example, if "n" is 16 and "x" is 2, then there are eight lines of the bus being used.

The receive section of each of LVDCs 2-4 receive the first through last x-bits analog TX signals from LVDC 1 as first through last x-bits analog RX signal at f1. The receive sections convert each of the first through last x-bits analog RX signals at f1 into first through last x-bits of RX data from LVDC 1. The receive sections then combine the first through last x-bits of RX data from LVDC 1 to produce n-bits of RX data from LVDC 1 per data clock interval.

Each of LVDCs 2-4 transmits sections converts n-bits of its TX data per data clock interval to LVDC 1 into first through last x-bits of TX data. The transmit sections convert the first through last x-bits of TX data into first through last x-bits analog TX signals at f2, f3, and f4, respectively. The transmit sections then transmit the first through last x-bits analog TX signals at f2, f3, and f4, respectively, on the lines of the bus.

The receive section of LVDC 1 receives the first through last x-bits analog TX signals at f2, f3, and f4 from LVDCs 2-4 as first through last x-bits analog RX signals at f2, f3, and f4. The receive section converts each of the first through last x-bits of each of the analog RX signals at f2, f3, and f4 into first through last x-bits of RX data from LVDCs, 2-4. The receive section then combines the first through last x-bits of RX data from LVDC 2 to produce n-bits of RX data from LVDC 2 per data clock interval; combines the first through last x-bits of RX data from LVDC 3 to produce n-bits of RX data from LVDC 3 per data clock interval, and combines the first through last x-bits of RX data from LVDC 4 to produce n-bits of RX data from LVDC 4 per data clock interval.

As a specific example, LVDC 1 is affiliated with a data processing host and LVDCs 2-4 are each affiliated with data collecting hosts. On a periodic basis, the data processing host requests, via LVDC 1, that the data collecting hosts send its recently collected data to the data processing host. In response to the requests, each of the data collecting hosts send their respective data, via LVDCs 2-4, to the data processing host, via LVDC 1.

In each of the examples using multiple lines of a bus, each LVDC includes a number of drive sense circuits, receive analog to digital circuits, and transmit digital to analog circuits that is equal to or greater than the number of lines of the bus being used. For example, if 8 lines of the bus are being used, then each LVDC coupled to the bus includes 8, or more, of each of the drive sense circuits, receive analog to digital circuits, and transmit digital to analog circuits.

Figure 27:
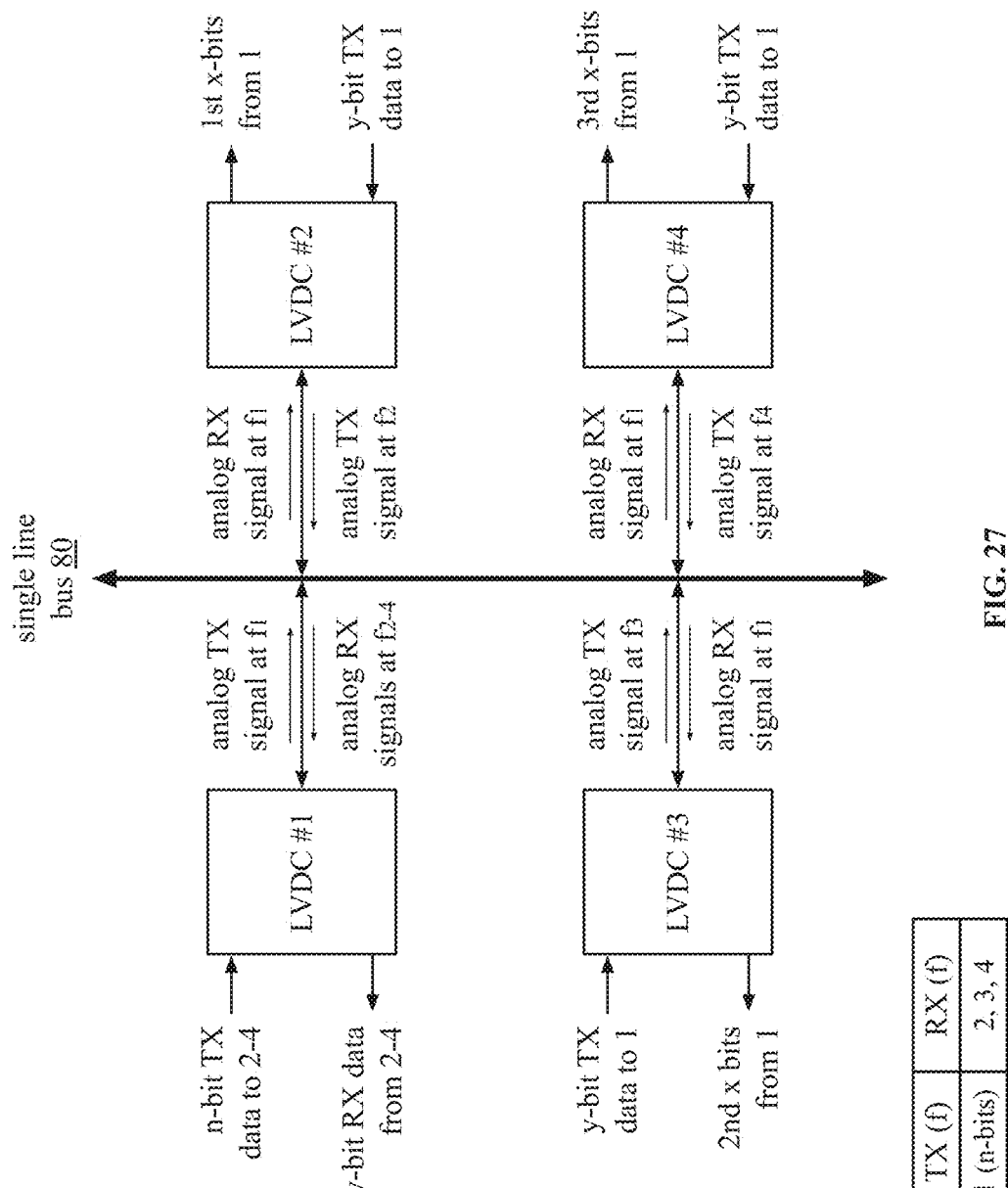
FIG. 27 is a schematic block diagram of another embodiment of a one-to-many communication between Low Voltage Drive Circuits (LVDCs) on a single line of a bus in accordance with the present invention.

FIG. 27 is a schematic block diagram of another embodiment of a one-to-many and many-to-one communication between Low Voltage Drive Circuits (LVDCs) on a single line of a bus 80. In this example, LVDC 1 is in communication with each of LVCDs 2, 3, and 4. For instance, LVDC 1 converts n-bits (multiples of 3 bits) of transmit (TX) data per data clock interval into an analog TX signal at f1 and transmits it on channel f1 of a line the bus 80 to each of LVDCs 2, 3, and 4.

The receive section of each of LVDCs 2, 3, and 4 are tuned to process the analog TX signal at f1 as an analog RX signal at f1 and recover the n-bits of TX data per data clock interval. The receive section of LVDC 2 outputs the first x-bits (e.g., ⅓ of the n-bits) from recovered n-bits; the receive section of LVDC 3 outputs the second x-bits (e.g., ⅓ of the n-bits) from recovered n-bits; and the receive section of LVDC 4 outputs the third x-bits (e.g., ⅓ of the n-bits) from recovered n-bits.

Communication from LVDCs 2-4 to LVDC 1 functions as discussed with reference to FIG. 25. In this manner, LVDC 1 can communication separate messages to each of the LVDCs 2-4 using a single channel on a line of the bus and each of the LVDCs 2-4 can provide separate responses to their unique messages from LVDC 1.

Figure 28:
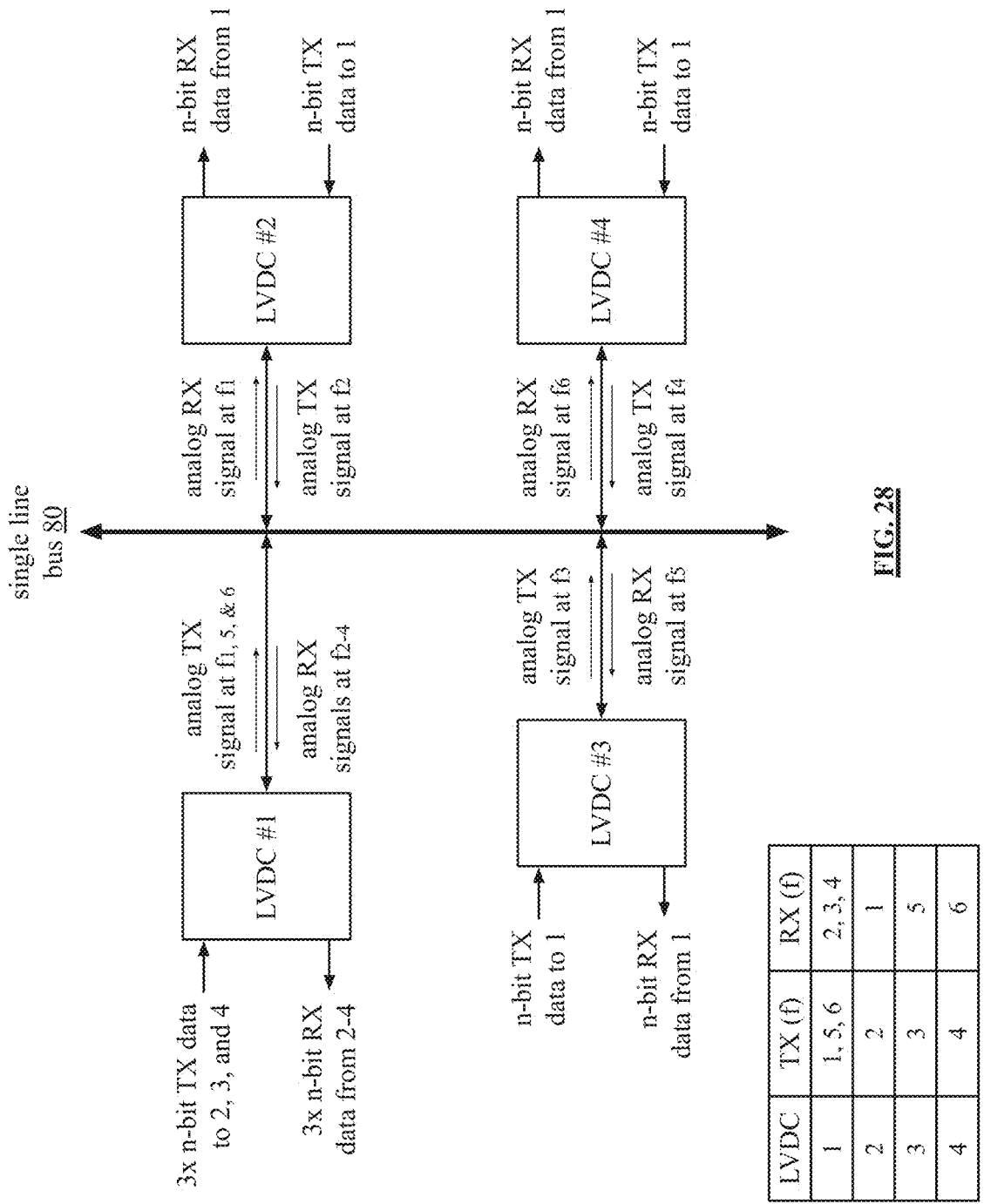
FIG. 28 is a schematic block diagram of another embodiment of a one-to-many communication between Low Voltage Drive Circuits (LVDCs) on a single line of a bus in accordance with the present invention.

FIG. 28 is a schematic block diagram of another embodiment of a one-to-many and many-to-one communication between Low Voltage Drive Circuits (LVDCs) on a single line of a bus 80. In this example, LVDC 1 is in communication with each of LVCDs 2, 3, and 4. For instance, LVDC 1 converts three separate n-bits of transmit (TX) data per data clock interval into three analog TX signals; one at f1, a second at f5, and a third at f6. LVDC 1 transmits the three analog TX signals on a line the bus 80 to each of LVDCs 2, 3, and 4.

The receive section of LVDC 2 is tuned to process the analog TX signal at f1 as an analog RX signal at f1 and recover the n-bits of TX data per data clock interval. The receive section of LVDC 3 is tuned to process the analog TX signal at f5 as an analog RX signal at f5 and recover the n-bits of TX data per data clock interval. The receive section of LVDC 4 is tuned to process the analog TX signal at f6 as an analog RX signal at f6 and recover the n-bits of TX data per data clock interval.

LVDC 2 converts n-bits of TX data destined for LVDC 1 into an analog TX signal f2 and transmits it on a line of the bus 80. Similarly, LVDC 3 converts n-bits of TX data destined for LVDC 1 into an analog TX signal f3 and transmits it on a line of the bus 80 and LVDC 4 converts n-bits of TX data destined for LVDC 1 into an analog TX signal f4 and transmits it a line of the bus 80.

The receive section of LVDC 1 recovers the n-bits of TX data per data clock cycle of LVDC 2 from analog RX signal at f2; recovers the n-bits of TX data per data clock cycle of LVDC 3 from analog RX signal at f3; and recovers the n-bits of TX data per data clock cycle of LVDC 4 from analog RX signal at f4. In this embodiment, LVDC 1 can communication separate messages to each of the LVDCs 2-4 using separate channels on a line of the bus and each of the LVDCs 2-4 can provide separate responses on other channels to their unique messages from LVDC 1.

Figure 29:
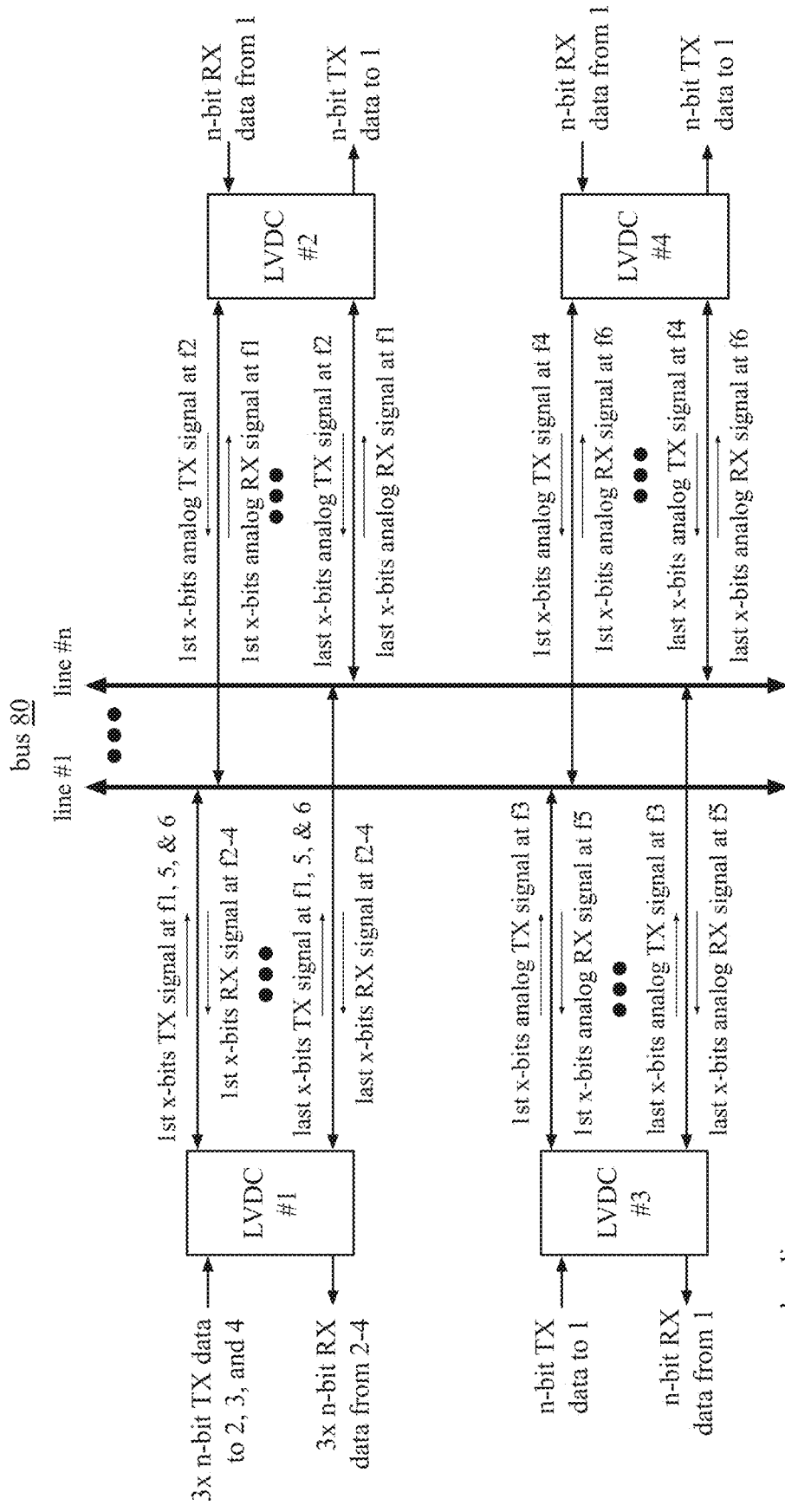
FIG. 29 is a schematic block diagram of another embodiment of a one-to-many communication between Low Voltage Drive Circuits (LVDCs) on multiple lines of a bus in accordance with the present invention.

FIG. 29 is a schematic block diagram of another embodiment of a one-to-many and many-to-one communication between Low Voltage Drive Circuits (LVDCs) on multiple lines of a bus 80. In this example, the bus 80 includes "n" lines, wherein "n" is an integer greater than or equal to 2. As in the example of FIG. 28, LVDC 1 is engaged in a one-to-many and many-to-one communication with LVDCs 2-4. In this example, however, the LVCDs are transmitting and receiving data via multiple lines of the bus, which increases the data rate conveyance between the LVDCs.

For example, LVDC 1 converts n-bits of TX data per data clock interval into an analog TX signal at f1 for LVDC 2; converts n-bits of TX data per data clock interval into an analog TX signal at f5 for LVDC 3; and converts n-bits of TX data per data clock interval into an analog TX signal at f6 for LVDC 4. For each of the LVDCs 2-4, LVDC 1 transmits a first x-bits of the n-bits of the TX data in a first analog TX signal transmitted on a first line of the bus, transmits a second x-bits of the n-bits of the TX data in a second analog TX signal transmitted on a second line of the bus, and so on until the last x-bits are transmitted on the last line of bus being used.

The receive section of LVDC 2 receives the first through last x-bits analog TX signals at f1 from LVDC 1 as first through last x-bits analog RX signal at f1; the receive section of LVDC 3 receives the first through last x-bits analog TX signals at f5 from LVDC 1 as first through last x-bits analog RX signal at f5; and the receive section of LVDC 4 receives the first through last x-bits analog TX signals at f6 from LVDC 1 as first through last x-bits analog RX signal at f6. Each of the receive sections convert their respective first through last x-bits of the analog RX signals into first through last x-bits of RX data from LVDC 1. Each of the receive sections then combine the first through last x-bits of RX data from LVDC 1 to produce n-bits of RX data from LVDC 1 per data clock interval.

The transmission of data from each of LVDCs 2-4 to LVCD 1 is similar to the transmission discussed with reference to FIG. 26. In this embodiment, LVDC 1 can communication separate messages to each of the LVDCs 2-4 using separate channels on multiple lines of the bus and each of the LVDCs 2-4 can provide separate responses on other channels on the multiple lines of the bus to their unique messages from LVDC 1.

Figure 30:
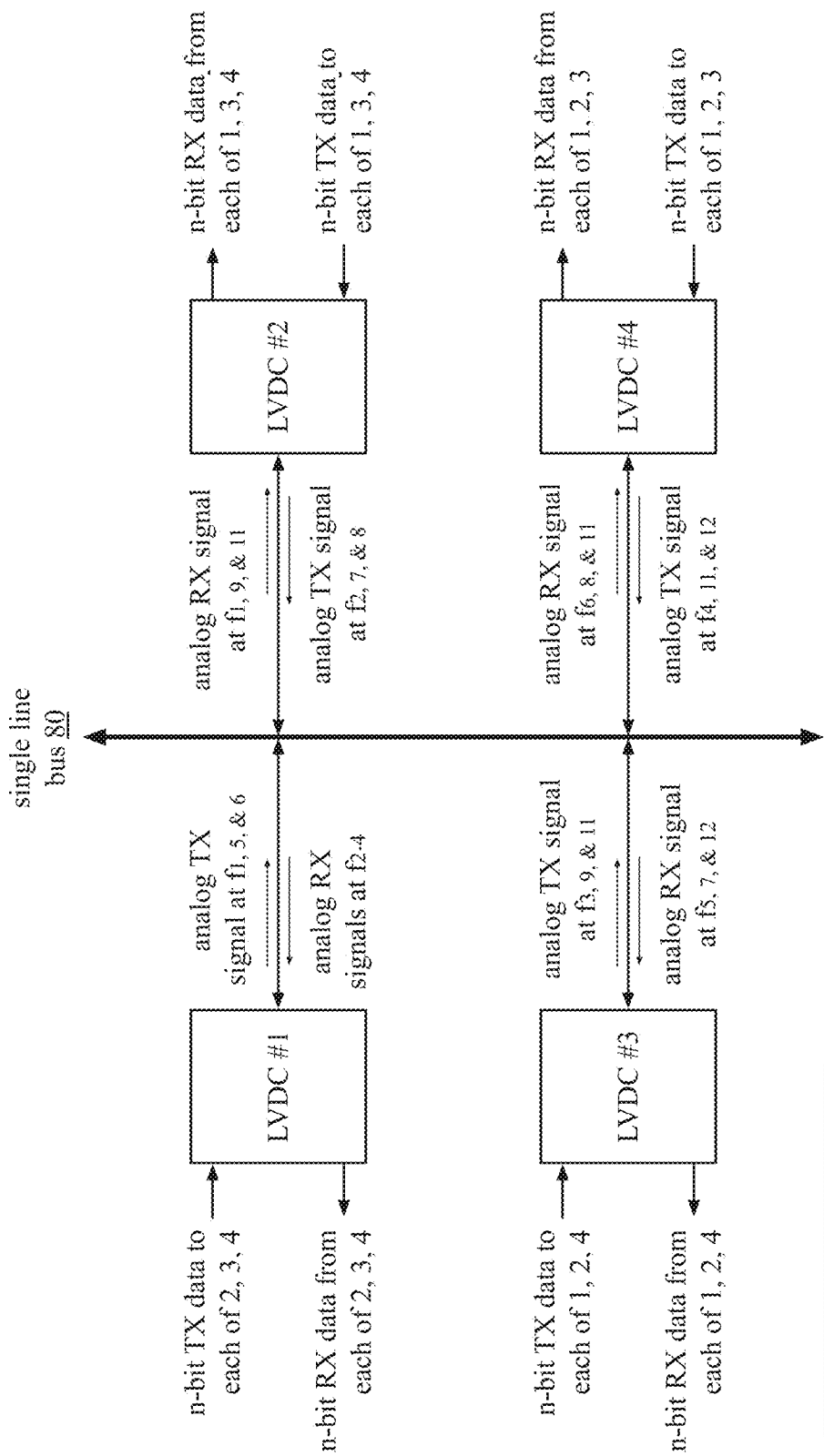
FIG. 30 is a schematic block diagram of another embodiment of many one-to-many communications between Low Voltage Drive Circuits (LVDCs) on a single line of a bus in accordance with the present invention.

FIG. 30 is a schematic block diagram of another embodiment of many one-to-many and many-to-one communications between Low Voltage Drive Circuits (LVDCs) on a single line of a bus 80. In this example, LVDC 1 is in a one-to-many and many-to-one communication with LVDCs 2-4; LVDC 2 is in a one-to-many and many-to-one communication with LVDCs 1, 3, 4; LVDC 3 is in a one-to-many and many-to-one communication with LVDCs 1, 2, 4; and LVDC 4 is in a one-to-many and many-to-one communication with LVDCs 1-3. A one-to-many and many-to-one communication operates as previously discussed.

The channels are allocated to support the many communications. For example, LVDC 1 transmits data to LVDC 2 on channel 1, transmits data to LVDC 3 on channel 5, and transmit data to LVDC 4 on channel 6. LVDC 1 receives data from LVDC 2 on channel 2, receives data from LVDC 3 on channel 3, and receives data from LVDC 4 on channel 4. As another example, LVDC 2 transmits data to LVDC 1 on channel 2, transmits data to LVDC 3 on channel 7, and transmit data to LVDC 4 on channel 8. LVDC 2 receives data from LVDC 1 on channel 2, receives data from LVDC 3 on channel 9, and receives data from LVDC 4 on channel 11. As yet another example, LVDC 3 transmits data to LVDC 1 on channel 3, transmits data to LVDC 2 on channel 9, and transmit data to LVDC 4 on channel 10. LVDC 3 receives data from LVDC 1 on channel 5, receives data from LVDC 2 on channel 7, and receives data from LVDC 4 on channel 12. As a further example, LVDC 4 transmits data to LVDC 1 on channel 4, transmits data to LVDC 2 on channel 11, and transmit data to LVDC 3 on channel 12. LVDC 4 receives data from LVDC 1 on channel 6, receives data from LVDC 2 on channel 8, and receives data from LVDC 3 on channel 10.

Figure 31:
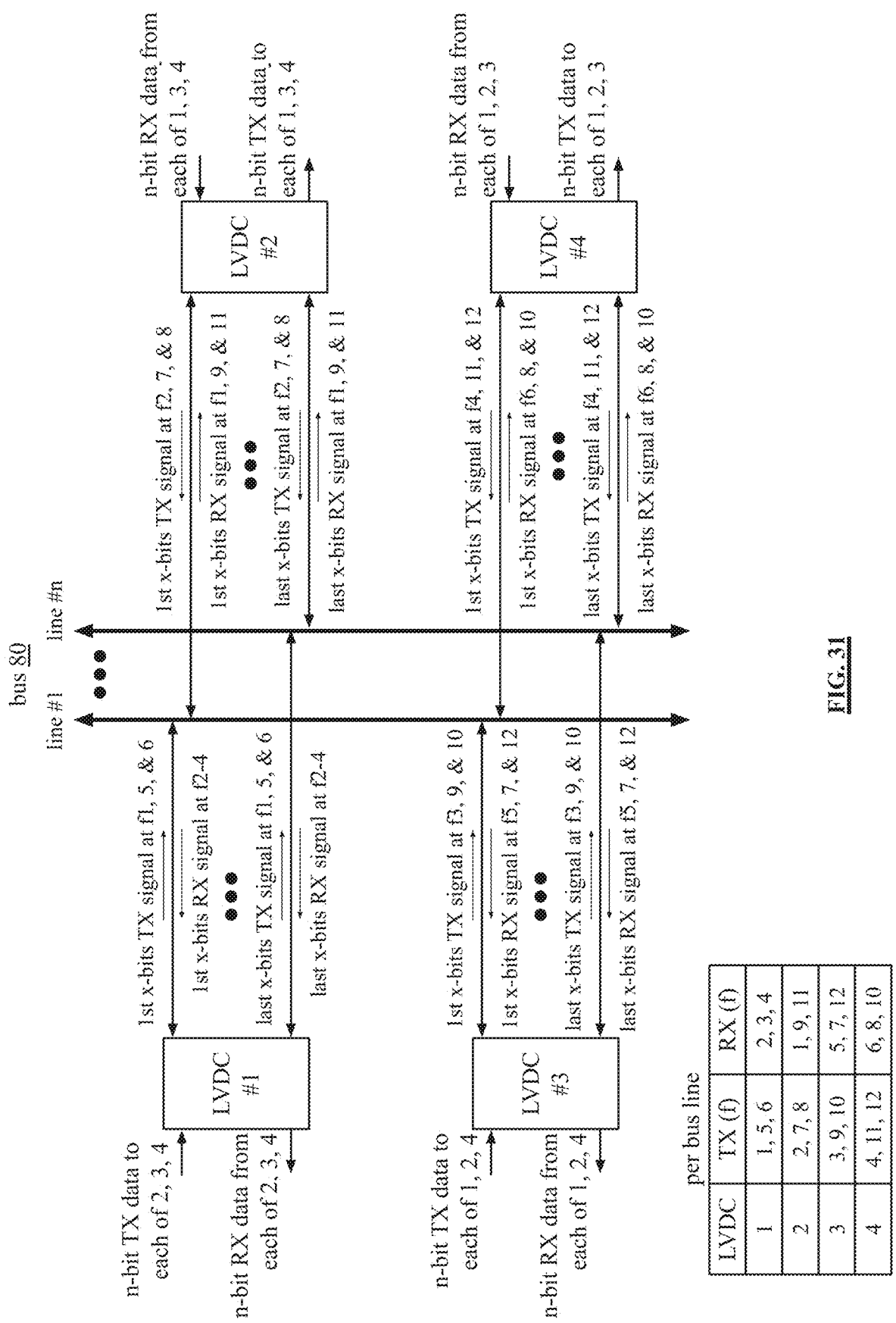
FIG. 31 is a schematic block diagram of another embodiment of many one-to-many communications between Low Voltage Drive Circuits (LVDCs) on multiple lines of a bus in accordance with the present invention.

FIG. 31 is a schematic block diagram of another embodiment of many one-to-many and many-to-one communications between Low Voltage Drive Circuits (LVDCs) on multiple lines of a bus 80. In this example, the bus 80 includes "n" lines, wherein "n" is an integer greater than or equal to 2. As in the example of FIG. 30, the LVDCs are engaged in many one-to-many and many-to-one communications. In this example, however, the LVCDs are transmitting and receiving data via multiple lines of the bus, which increases the data rate conveyance between the LVDCs.

Figure 32:
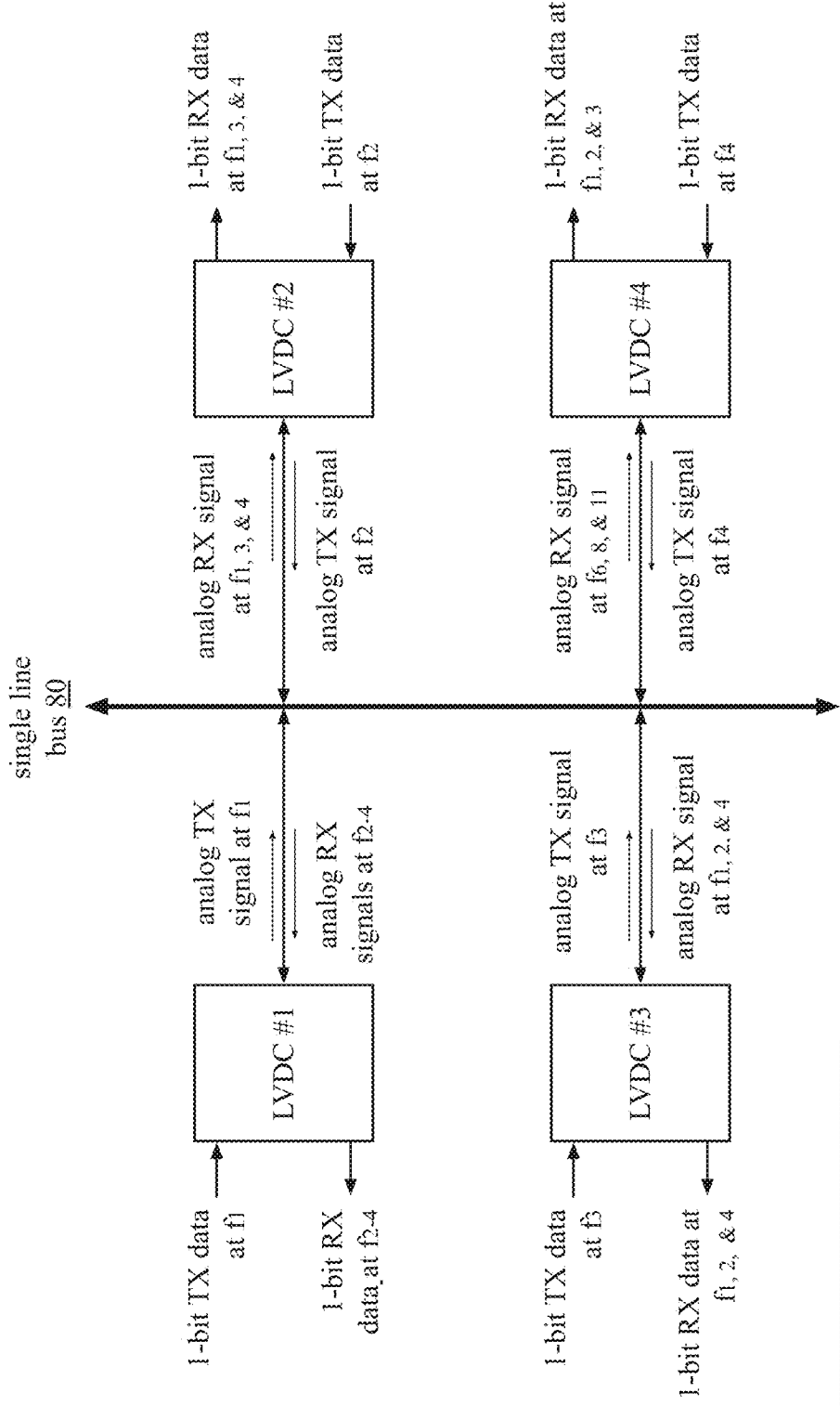
FIG. 32 is a schematic block diagram of another embodiment of many broadcast communications between Low Voltage Drive Circuits (LVDCs) on a single line of a bus in accordance with the present invention.

FIG. 32 is a schematic block diagram of another embodiment of many broadcast communications between Low Voltage Drive Circuits (LVDCs) on a single line of a bus 80. In this example, LVDC 1 is in a broadcast communication with LVDCs 2-4; LVDC 2 is in a broadcast communication with LVDCs 1, 3, 4; LVDC 3 is in a broadcast communication with LVDCs 1, 2, 4; and LVDC 4 is in a broadcast communication with LVDCs 1-3. A broadcast communication is sending by one LVDC to many other LVDCs and not receiving a direct response. For example, a software update can be done using a broadcast communication. As another example, streaming video can be done using a broadcast communication.

The channels are allocated to support the broadcast communications. For example, LVDC 1 transmits data to LVDCs 2-4 on channel 1, LVDC 2 transmits data to LVDCs 1, 3, 4 on channel 2, LVDC 3 transmits data to LVDCs 1, 2, 4 on channel 3, and LVDC 4 transmits data to LVDCs 1, 2, 3 on channel 4.

Figure 33:
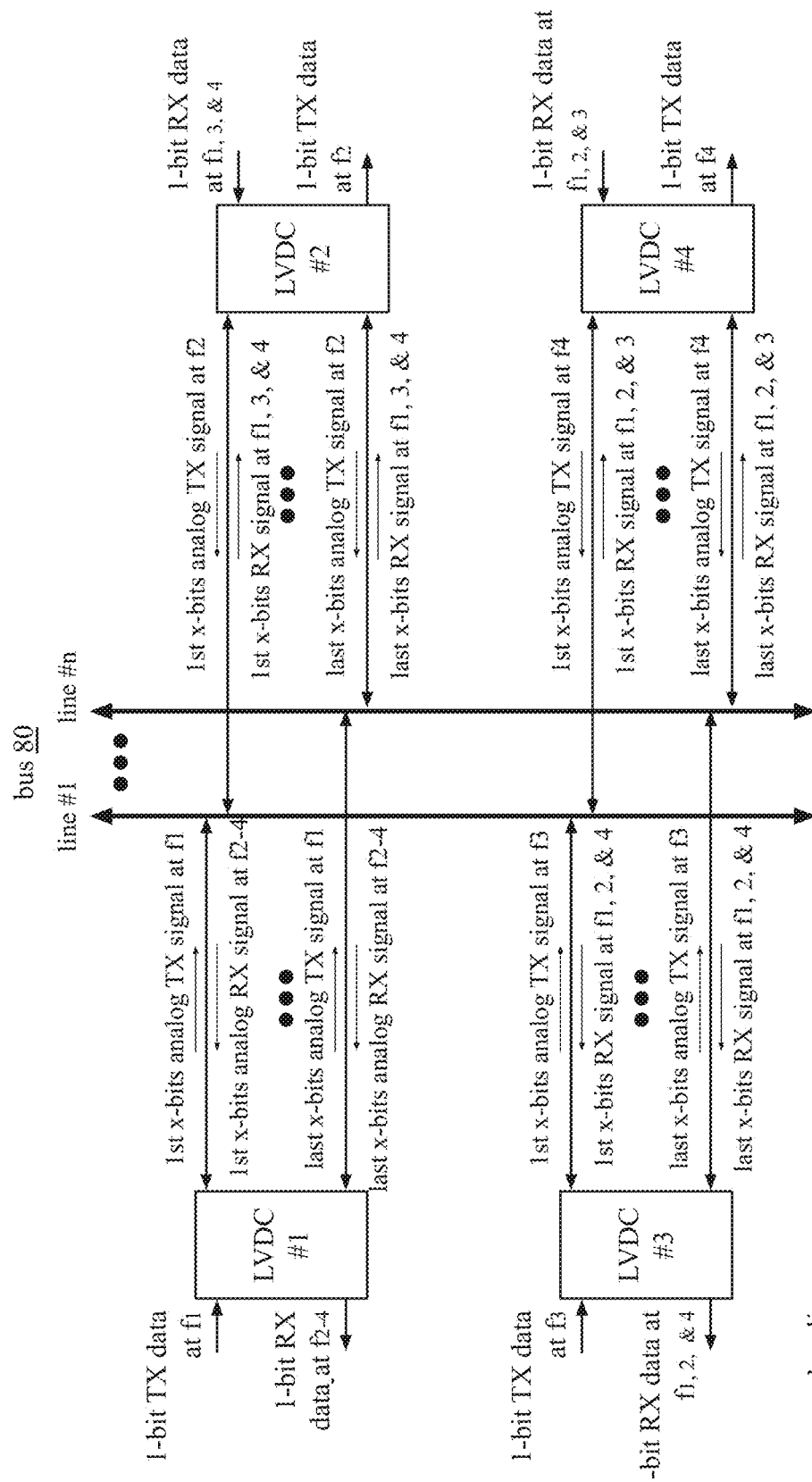
FIG. 33 is a schematic block diagram of another embodiment of many broadcast communications between Low Voltage Drive Circuits (LVDCs) on multiple lines of a bus in accordance with the present invention.

FIG. 33 is a schematic block diagram of another embodiment of many broadcast communications between Low Voltage Drive Circuits (LVDCs) on multiple lines of a bus 80. In this example, the bus 80 includes "n" lines, wherein "n" is an integer greater than or equal to 2. As in the example of FIG. 32, the LVDCs are engaged in many broadcast communications. In this example, however, the LVCDs are transmitting data via multiple lines of the bus, which increases the data rate conveyance between the LVDCs.

Figure 34:
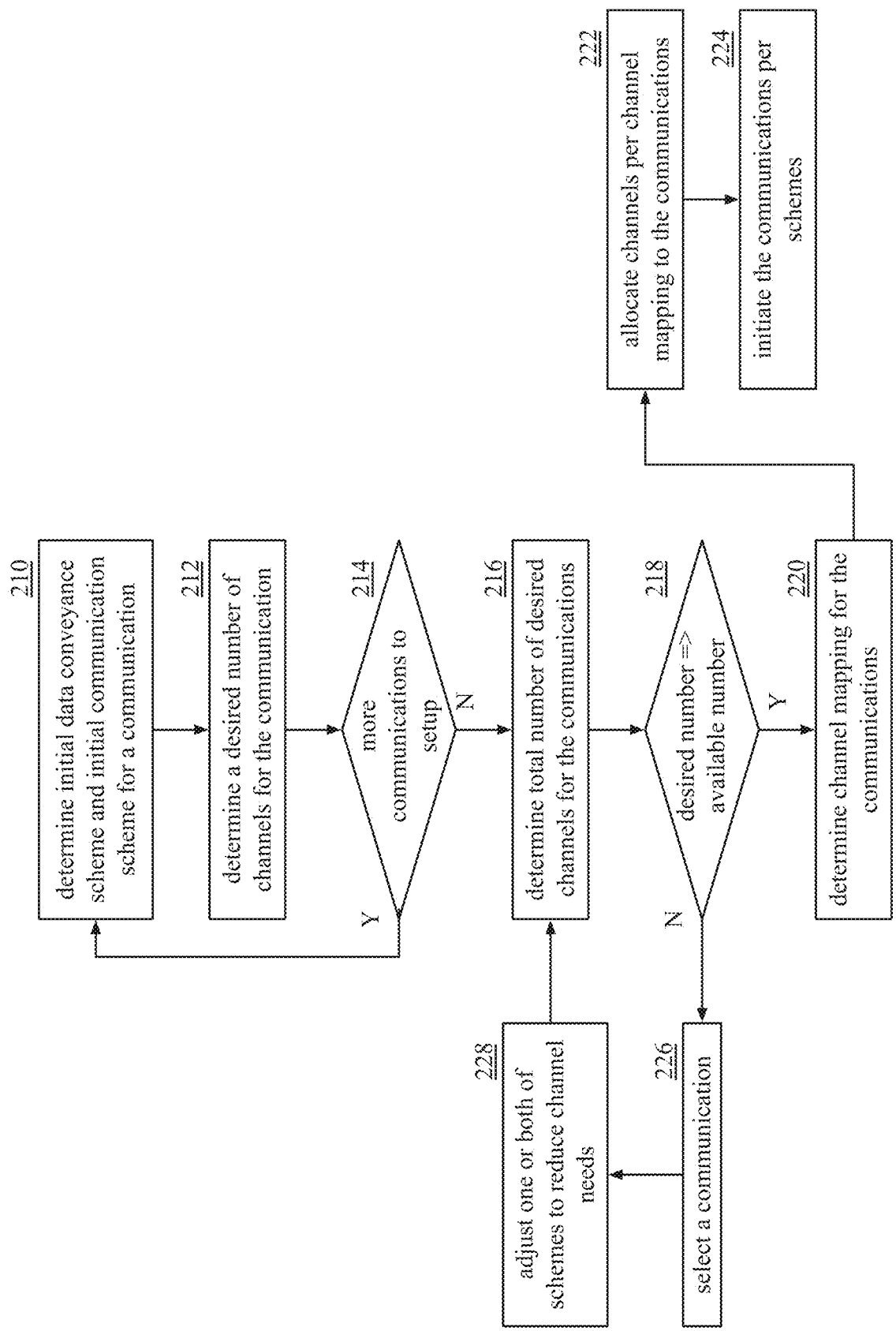
FIG. 34 is a logic diagram of another example of a method allocating channels for a communication between Low Voltage Drive Circuits (LVDCs) in accordance with the present invention.

FIG. 34 is a logic diagram of another example of a method allocating channels for a communication between Low Voltage Drive Circuits (LVDCs) executed by one or more processing entities, where a processing entity includes one or more of: the host device, a processing module of a host device, memory storing a LVDC driver (e.g., a set of operational instructions), a controller of an LVDC, and the LVDC. While executing the method, processing entity (or one or more of its components) operate in a dominant LVDC state, a passive LVDC state, or a peer LVDC state.

The method begins at step 210 where the processing entity determines an initial data conveyance scheme and an initial communication scheme for each communication of a plurality of communications on a line, or lines, of a bus. As such, the processing entity is determining a plurality of initial data conveyance schemes and a plurality of initial communication schemes. As previously discussed, data is conveyed within a communication by varying loading on the bus at a channel in accordance with a corresponding data conveyance scheme and a corresponding communication scheme.

As part of step 210, the processing entity determines a number of communications to be supported. This may be done in a variety of ways. For example, a dominant LVDC sends a communication setup request to the processing entity via a control channel. The setup request includes one or more of: the identity of the LVDCs that are to participate in the communication, the type of communication (e.g., one to one, one to many, broadcast, continuous, sporadic, etc.), a desired data rate (which may be for all of the LVDCs involved, for each LVDC, or a combination thereof), identify the associated host devices, type of data (e.g., streaming data, etc.), priority of the data, etc. The processing entity receives the communication setup requests to determine a number of communications. In an embodiment, this occurs at startup of a system. In another embodiment, this is done as LVDCs are activated to, and/or deactivated from, communicating on the bus.

As another example, the processing entity accesses a lookup table for the LVDCs to determine the number of communications and the communications' setup requests. This typically occurs at start, but can also occur as LVDCs are activated to, and/or deactivated from, communicating on the bus.

Based on the number of communications and their setup requests, the processing entity determines the initial data conveyance scheme and the initial communication scheme for each communication. This may be done in a variety of ways. For example, the processing entity accesses a lookup table based on the communication setup requests to identify the initial data conveyance scheme and the initial communication scheme. As another example, the processing entity calculates the initial data conveyance scheme and the initial communication scheme based on the communication setup requests for each communication.

The method continues at step 212, where the processing entity determines a desired number of channels for each communication based on its initial data conveyance scheme and its initial communication scheme. The processing entity executes steps 210 and 212 in a loop fashion for each communication to be supported by a line, or lines, of the bus. At step 214, the processing entity determines whether there are more communications to setup. If yes, the method repeats at step 210.

If not, the method continues at step 216 where the processing entity determines a total desired number of channels for all of the communications based on the desired number of channels for each communication. The method continues at step 218 where the processing entity determines whether the total desired number of channels exceeds a total number of available channels. If not, the method continues at step 220 where the processing entity maps out channel allocation to the channels. The method continues to step 222 where the processing entity allocates channels to the communications in accordance with the mapping. The method continues at step 224 where the processing entity and/or the LVDCs initiate communications in accordance with their respective data conveyance scheme and communication scheme.

If, at step 218, the desired number of channels is less than the available number of channels, the method continues at step 226 where the processing entity selects a particular communication of the communications. This can be done at random, based on priority of data being conveyed, based on identity of host devices, etc. The method continues at step 228 where the processing entity adjusts the initial data conveyance scheme and/or the initial communication scheme of the particular communication to reduce a desired number of channels for the particular communication. For example, the processing entity determines to change an element of the data conveyance scheme and/or an element of the communication scheme. Refer to the discussion of FIGS. 20 and 21 for a listing of the data conveyance scheme elements and of the communication scheme elements. The method then repeats at step 216.

If, after exhausting, adjusting elements of the schemes for selected communications, the processing entity determines a time-division channel mapping (e.g., communications use the same channels, but at different times) for the communications. The processing entity then allocates the available channels to the communications in accordance with the time-division channel mapping. The communications are then initiated in accordance with the time-division channel mapping, the data conveyance schemes, and the communication schemes.

Figure 35:
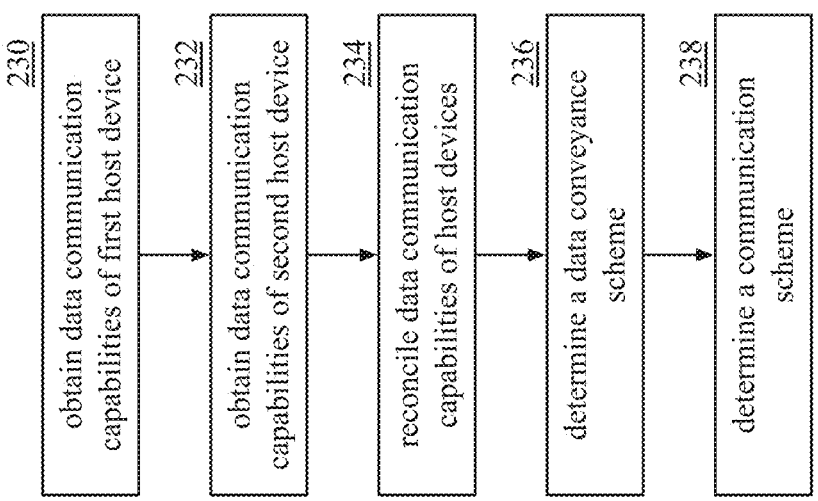
FIG. 35 is a logic diagram of another example of a method allocating channels for a communication between Low Voltage Drive Circuits (LVDCs) in accordance with the present invention.

FIG. 35 is a logic diagram of another example of a method allocating channels for a one-to-one communication between Low Voltage Drive Circuits (LVDCs) executed by LVDCs. While executing the method, an LVDC operates in a dominant LVDC state, a passive LVDC state, or a peer LVDC state. The method begins at step 230 where a first LVDC obtains data communication capabilities of its host device (i.e., the host device to which the first LVDC is affiliated). The obtaining of the data communication capabilities may be done in a variety of ways. For example, a controller of the LVDC accesses a lookup table to determine the host's data communication capabilities. As another example, the LVDC communicates with its host device to obtain the data communication capabilities.

The data communication capabilities include two or more of:
  usable data rates;
  double data rate;
  clock rate;
  bits per interval of data rate (or data per clock rate interval);
  full or duplex communication;
  digital data format;
  digital data packet format;
  independent data transmit;
  independent data receive;
  dependent data transmit; and
  dependent data receive.

The method continues at step 232 where a second LVDC obtains data communication capabilities of its host device. The method continues at step 234 where the first and second LVDCs reconcile the data communication capabilities of the first host device and the data communication capabilities of the second host device to produce reconciled data communication capabilities. For example, if the data communication capabilities of both hosts match, then they are reconciled. As another example, if the data communication capabilities of the hosts don't match, then a parameter of one of the data communication capabilities of one of the hosts is adjusted. As a specific example, if one host has a data rate of 1 Giga-bit-per-second (Gbps) and the other host has a data rate of 2 Gbps, then the others hosts data rate would be lowered to 1 Gbps to reconcile the data communication capabilities.

The method continues to step 236 where the first and/or the second LVDC determine a data conveyance scheme for a one-to-one communication between the first and second LVDC based on the reconciled data communication capabilities. The data conveyance scheme was discussed with reference to FIGS. 20 and 21. The method continues at step 238 where the first and/or the second LVDC determine a communication scheme for the one-to-one communication between the first and second LVDC based on the reconciled data communication capabilities. The communication scheme was discussed with reference to FIGS. 20 and 21.

Figure 36:
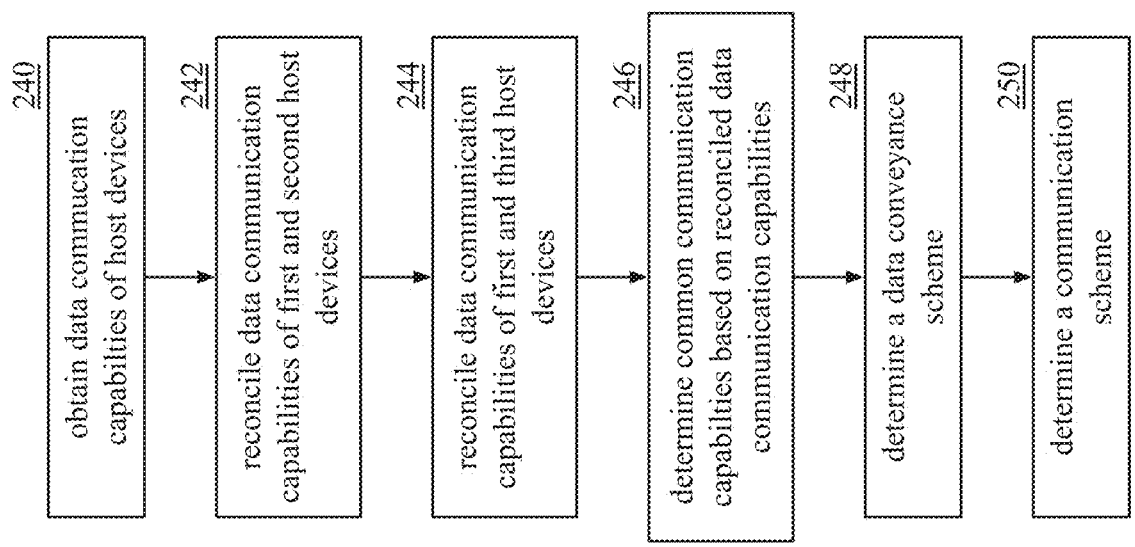
FIG. 36 is a logic diagram of another example of a method allocating channels for a communication between Low Voltage Drive Circuits (LVDCs) in accordance with the present invention.

FIG. 36 is a logic diagram of another example of a method allocating channels for a one-to-one communication between Low Voltage Drive Circuits (LVDCs) executed by LVDCs. While executing the method, an LVDC operates in a dominant LVDC state, a passive LVDC state, or a peer LVDC state. The method begins at step 240 where LVDCs obtain data communication capabilities from their respective host devices. This produces produce a plurality of data communication capabilities. The obtaining of data communication capabilities was discussed with reference to FIG. 35.

The method continues at step 242 where first and second LVDCs of the LVDCs reconcile data communication capabilities of first and second host devices of the host devices to produce first reconciled data communication capabilities. The reconciling of data communication capabilities was discussed with reference to FIG. 35.

The method continues at step 244 where first LVDC and third LVDCs of the LVDCs reconcile the data communication capabilities of the first host device and data communication capabilities of a third host device to produce second reconciled data communication capabilities. The method continues at step 246 where the first, second, and/or third LVDC determine a common data communication capabilities based on the first and second reconciled data communication capabilities. This can be done in a similar manner as when the data communication capabilities were reconciled.

The method continues at step 248 where the first, second, and/or third LVDC determine a data conveyance scheme for a multiple party communication between the first, second, and third LVDCs based on the common data communication capabilities. The method continues at step 250 where the first, second, and/or third LVDC determine a communication scheme for the multiple party communication based on the common data communication capabilities.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A communication system comprises:
   three low voltage drive circuits operable for coupling to a wired bus, wherein a low voltage drive circuit of the three low voltage drive circuits includes:
      a transmit section operably coupled to convert transmit digital data into a first and second analog transmit signal for a one to many communication, wherein each of the first and second analog transmit signals includes one or more transmit frequency components;
      a receive section operably coupled to convert an analog receive signal that includes one or more receive frequency components into received digital data; and
      a drive sense circuit for coupling to the wired bus, wherein the drive sense circuit is operably coupled to transmit the first and second analog transmit signals onto the wired bus and to receive the analog receive signal from the wired bus; and
   after the three low voltage drive circuits are operably coupled to the wired bus, each of the three voltage drive circuits is configured for communication among the three low voltage drive circuits, for one-to-one communication, for one-to-many communication, and for many-to-one communication.

2. The communication system of claim 1 further comprises:
   a first low voltage drive circuit of the three low voltage drive circuit is allocated:
      a first transmit frequency component for transmitting to a second low voltage drive circuit of the three low voltage drive circuit; and
      a second transmit frequency component for transmitting to a third low voltage drive circuit of the three low voltage drive circuit;
   the second low voltage drive circuit is allocated:
      a third transmit frequency component for transmitting to the first low voltage drive circuit; and
      a fourth transmit frequency component for transmitting to the third low voltage drive circuit; and
   the third low voltage drive circuit is allocated:
      a fifth transmit frequency component for transmitting to the first low voltage drive circuit; and
      a sixth transmit frequency component for transmitting to the second low voltage drive circuit.

3. The communication system of claim 2 further comprises:
   a controller operably coupled to allocate the first through sixth transmit frequency components to the first, second, and third low voltage drive circuits.

4. The communication system of claim 2 further comprises:
   the transmit section of the first low voltage drive circuit receives the allocation of the first and second frequency components from a processing module of a host device;
   the receive section of the first low voltage drive circuit receives, from the processing module:
      the allocation of the third and fourth transmit frequency components to the second low voltage drive circuit as third and fourth receive frequency components; and
      the allocation of the fifth and sixth transmit frequency components to the third low voltage drive circuit as fifth and sixth receive frequency components.

5. The communication system of claim 2 further comprises:
   for the one-to-one communication:
      the first low voltage drive circuit transmits at least a portion of first transmit data to the second low voltage drive circuit via the wired bus using the first transmit frequency component; and
      the second low voltage drive circuit transmits at least a portion of second transmit data to the first low voltage drive circuit via the wired bus using the third transmit frequency component.

6. The communication system of claim 2 further comprises:
   for the one-to-many communication:
      the first low voltage drive circuit transmits:
         at least a portion of first transmit data to the second low voltage drive circuit via the wired bus using the first transmit frequency component; and
         the at least a portion of the first transmit data to the third low voltage drive circuit via the wired bus using the second transmit frequency component;
      the second low voltage drive circuit transmits at least a portion of second transmit data to the first low voltage drive circuit via the wired bus using the third transmit frequency component; and
      the third low voltage drive circuit transmits at least a portion of third transmit data to the first low voltage drive circuit via the wired bus using the fifth transmit frequency component.

7. The communication system of claim 2 further comprises:
   for the many-to-one communication:
      the second low voltage drive circuit transmits at least a portion of second transmit data to the first low voltage drive circuit via the wired bus using the third transmit frequency component;
      the third low voltage drive circuit transmits at least a portion of third transmit data to the first low voltage drive circuit via the wired bus using the fifth transmit frequency component; and the first low voltage drive circuit transmits:
: a first portion of first transmit data to the second low voltage drive circuit via the wired bus using the first transmit frequency component; and
: a second portion of the first transmit data to the third low voltage drive circuit via the wired bus using the second transmit frequency component.

8. The communication system of claim 1, wherein the drive sense circuit is further operable to:
drives:
: drive the analog transmit signal onto a first line of the wired bus; and
: drive the second analog transmit signal onto a second line of the wired bus.

* * * * *